(12) United States Patent
Schenk et al.

(10) Patent No.: US 10,099,295 B2
(45) Date of Patent: Oct. 16, 2018

(54) DRILL CHUCK

(71) Applicant: Roehm GmbH, Sontheim/Brenz (DE)

(72) Inventors: Peter Schenk, Niederstotzingen (DE); Christian Thiemann, Muensingen (DE); Patrick Hengsberger, Sontheim/Brenz (DE)

(73) Assignee: Roehm GmbH, Sontheim/Brenz (DE)

( * ) Notice: Subject to any disclaimer, the term of this patent is extended or adjusted under 35 U.S.C. 154(b) by 171 days.

(21) Appl. No.: 14/522,647

(22) Filed: Oct. 24, 2014

(65) Prior Publication Data
US 2015/0115550 A1    Apr. 30, 2015

(30) Foreign Application Priority Data

Oct. 24, 2013 (DE) .................. 10 2013 111 731

(51) Int. Cl.
    *B23B 31/12* (2006.01)
(52) U.S. Cl.
    CPC ........ *B23B 31/123* (2013.01); *B23B 31/1253* (2013.01); *B23B 31/1238* (2013.01); *B23B 31/1246* (2013.01); *Y10T 279/17615* (2015.01)
(58) Field of Classification Search
    CPC .............. B23B 31/1215; B23B 31/123; B23B 31/1246; B23B 2226/61; B23B 2231/06; B23B 31/1253; Y10T 279/17641
    See application file for complete search history.

(56) References Cited

U.S. PATENT DOCUMENTS

| 5,234,223 A | * | 8/1993 | Sakamaki | ............. B23B 31/123 279/61 |
| 5,470,084 A | * | 11/1995 | Reibetanz | ........... B23B 31/1238 173/48 |
| 6,360,856 B1 | | 3/2002 | Koh | |
| 7,360,770 B2 | | 4/2008 | Luckenbaugh et al. | |

(Continued)

FOREIGN PATENT DOCUMENTS

| CN | 103252513 A | 8/2013 |
| DE | 198 32 891 A | 2/2000 |

(Continued)

OTHER PUBLICATIONS

Japanese Office Action for Japanese Application No. 2014-215545 dated May 29, 2018— English translation.

*Primary Examiner* — Daniel Howell
*Assistant Examiner* — Paul M Janeski
(74) *Attorney, Agent, or Firm* — Muncy, Geissler, Olds & Lowe, P.C.

(57) ABSTRACT

A drill chuck having a chuck body, on which a threaded ring is guided, which is in engagement with rows of teeth assigned to clamping jaws for the purpose of adjusting the clamping jaws having a thread and guided in the chuck body, as well as comprising a clamping sleeve which surrounds the chuck body and may be coupled with the threaded ring in a torque-transmitting manner and which may be coupled with the chuck body by a locking device. The locking device is formed by a locking sleeve, which has a lock toothing and is rotatably fixedly connected to the threaded ring and which is axially movable between a drilling configuration and a clamping configuration relative to the threaded ring and the clamping sleeve; the locking device is also formed by a mating toothing assigned to the chuck body.

15 Claims, 20 Drawing Sheets

(56) References Cited

U.S. PATENT DOCUMENTS

| | | |
|---|---|---|
| 2006/0136124 A1 | 6/2006 | Adamczyk et al. |
| 2011/0215537 A1* | 9/2011 | Cachod .............. B23B 31/1246 279/61 |
| 2013/0264781 A1 | 10/2013 | Mason |

FOREIGN PATENT DOCUMENTS

| | | | |
|---|---|---|---|
| DE | 102007024373 A1 * | 12/2007 | ........... B23B 31/123 |
| JP | 2006-055992 A | 3/2006 | |
| WO | WO 2008/122159 A1 | 10/2008 | |

* cited by examiner

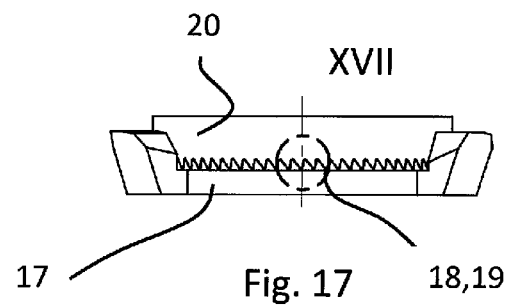
Fig. 17
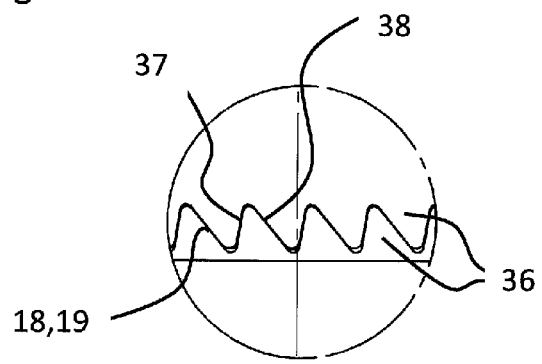
Fig. 18.1
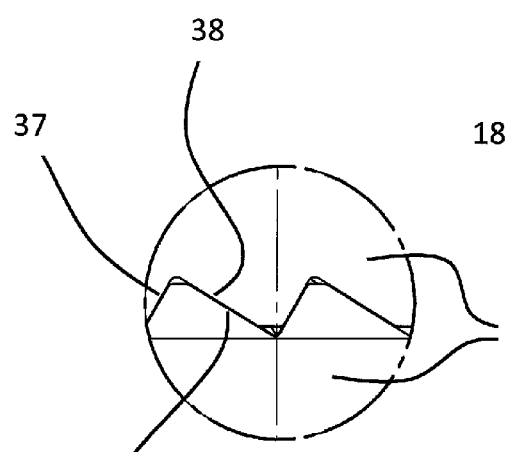
Fig. 18.2
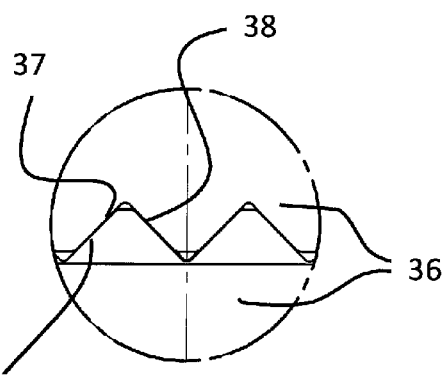
Fig. 18.3
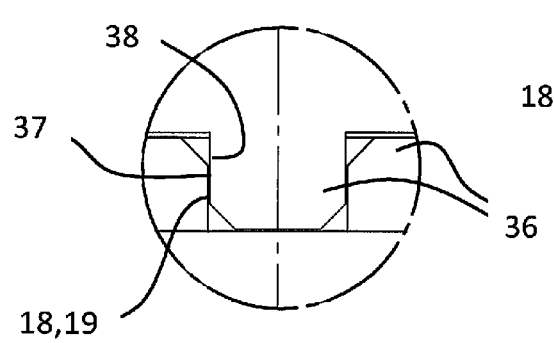
Fig. 18.4

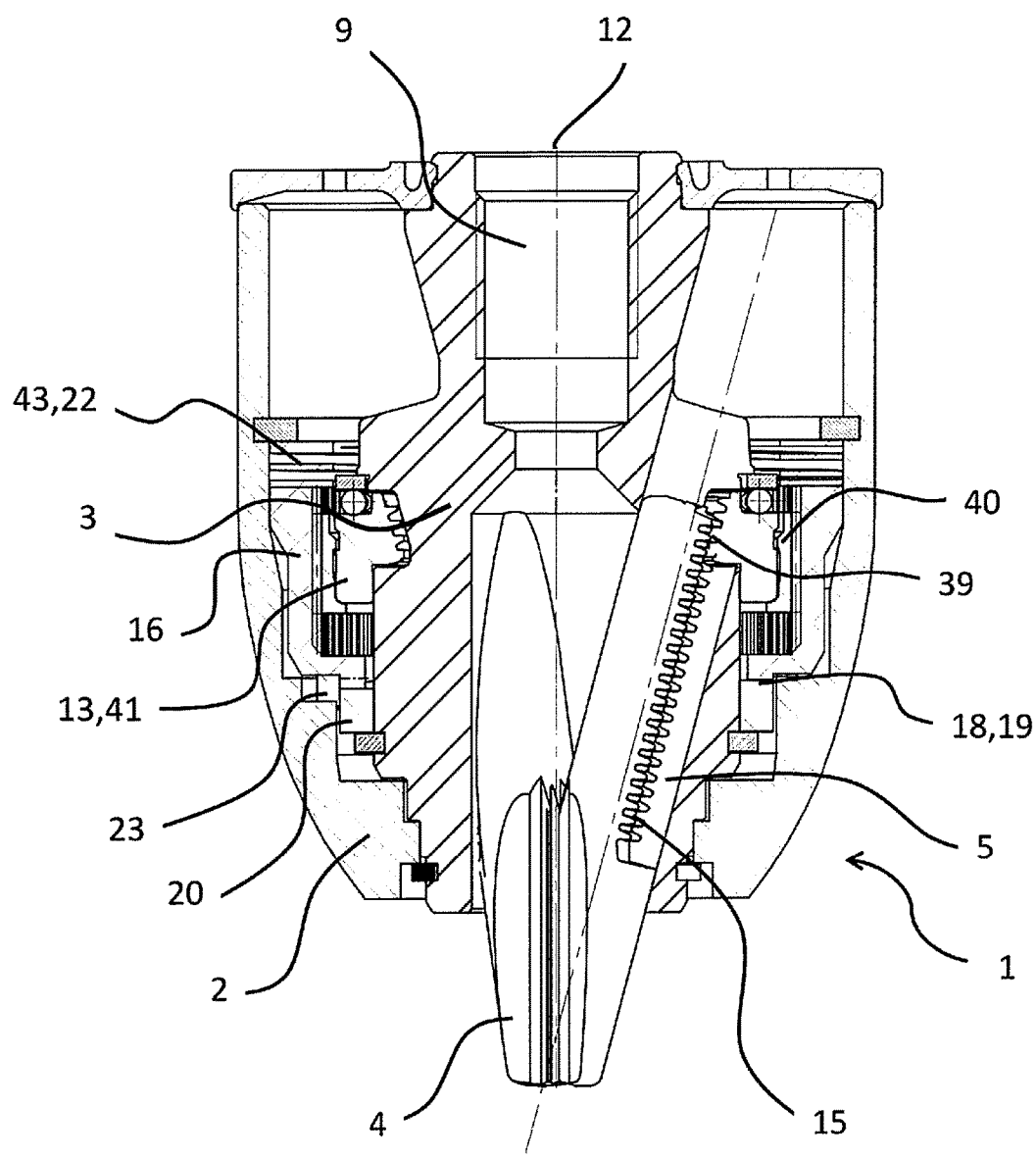
Fig. 21.1

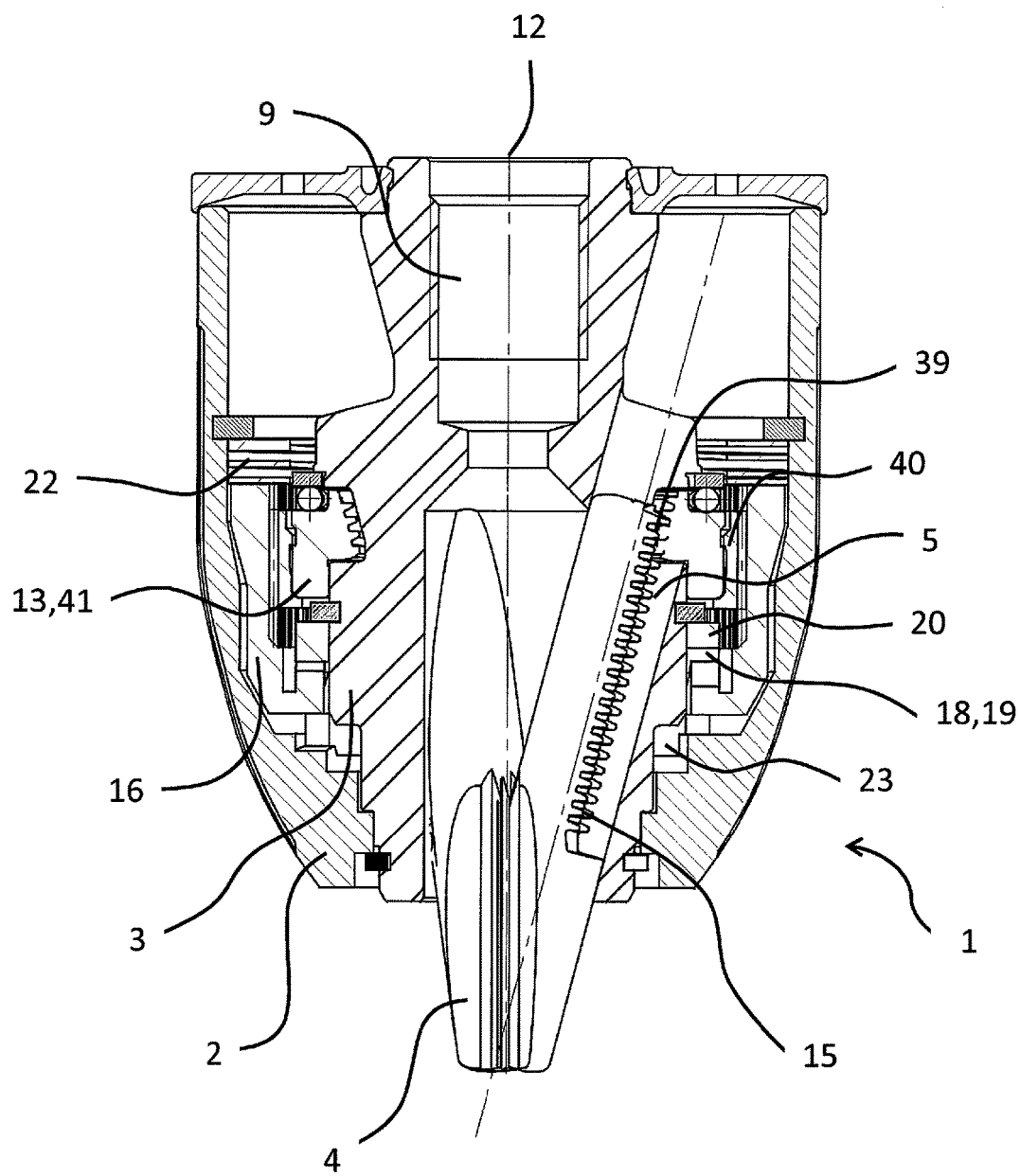
Fig. 21.2

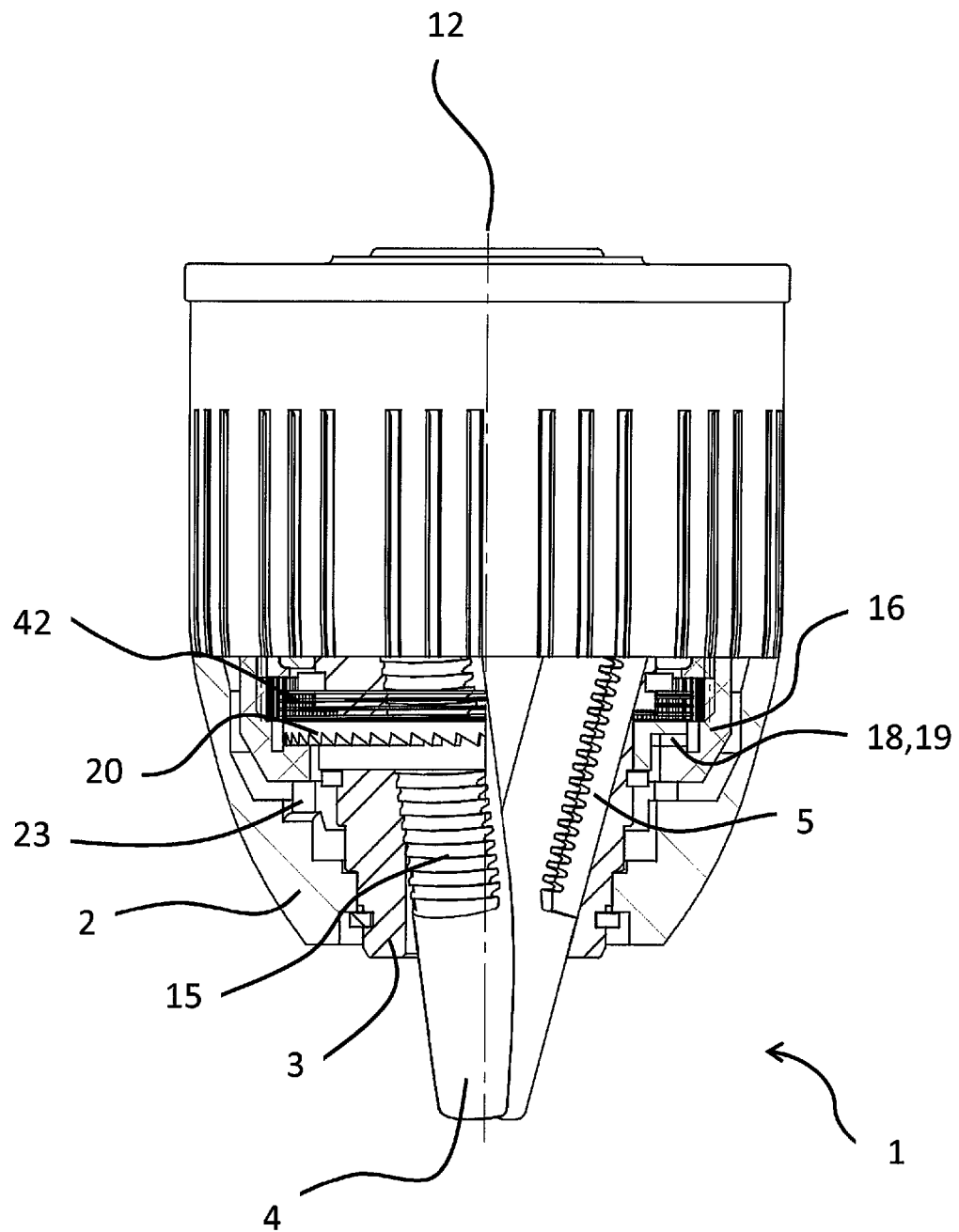
Fig. 21.3

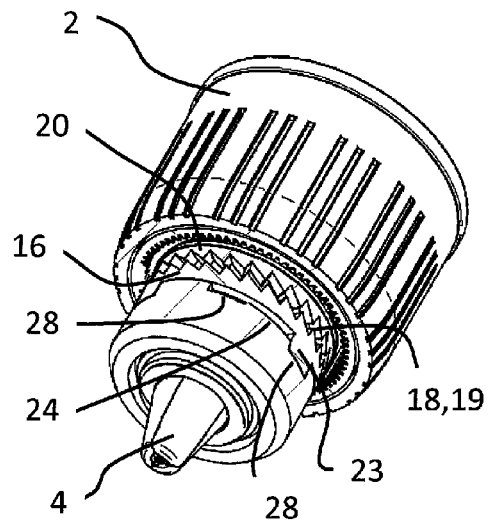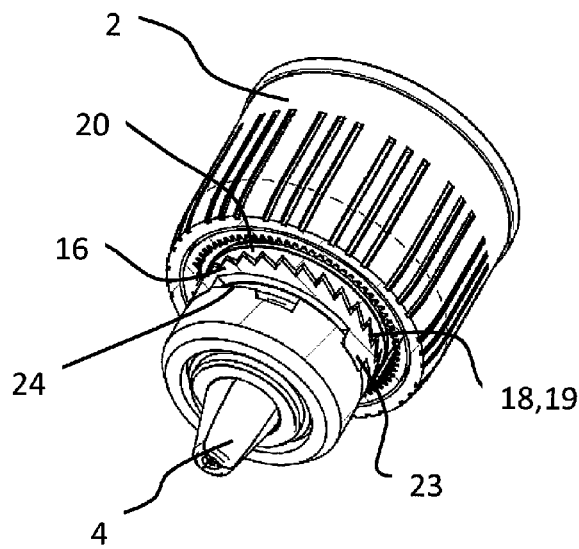
Fig. 23.1　　　　　　Fig. 24.1
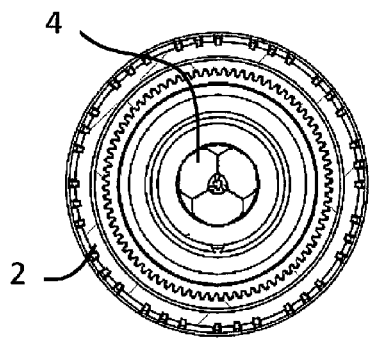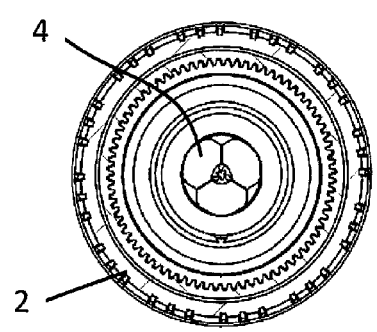
Fig. 23.2　　　　　　Fig. 24.2
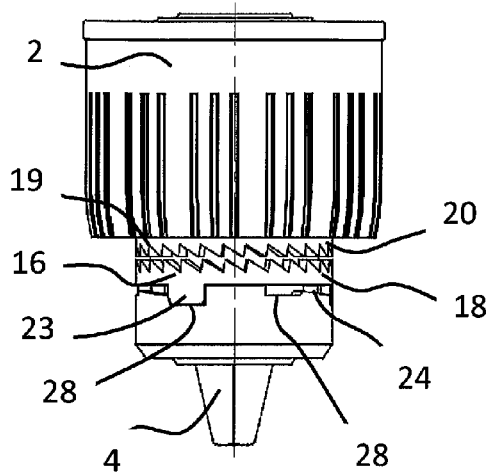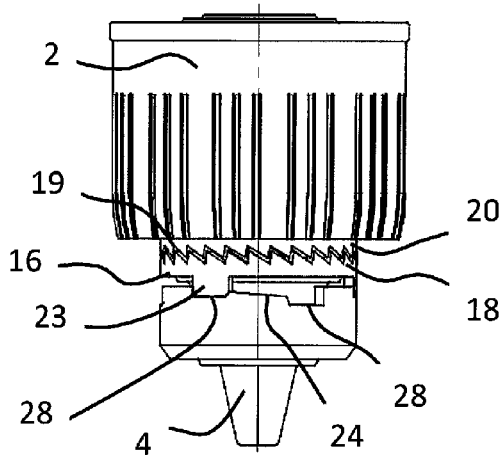
Fig. 23.3　　　　　　Fig. 24.3

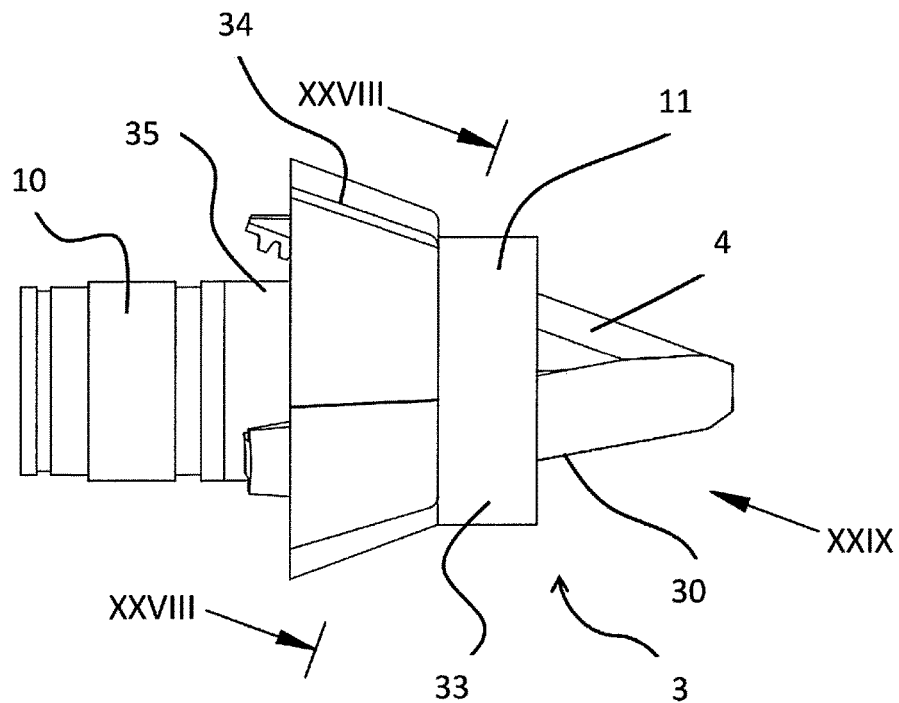
Fig. 27
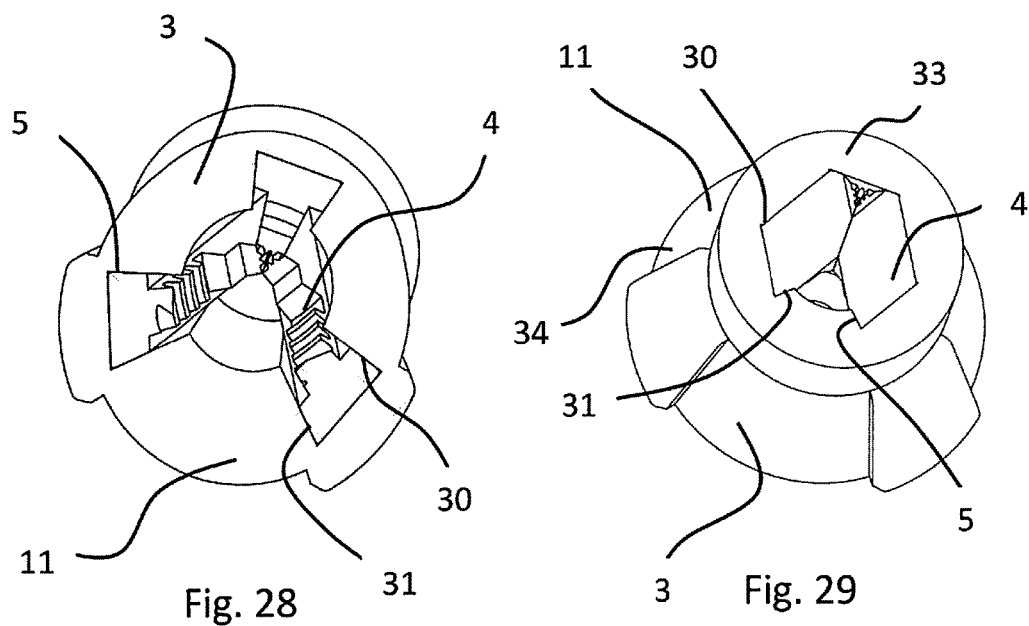
Fig. 28
Fig. 29

DRILL CHUCK

This nonprovisional application claims priority under 35 U.S.C. § 119(a) to German Patent Application No. 10 2013 111 731.7, which was filed in Germany on Oct. 24, 2013, and which is herein incorporated by reference.

BACKGROUND OF THE INVENTION

Field of the Invention

The invention relates to a drill chuck, comprising a chuck body on which a threaded ring is guided, which is in engagement with rows of teeth assigned to clamping jaws for the purpose of adjusting the clamping jaws guided in the chuck body and having a thread, as well as comprising a clamping sleeve which surrounds the chuck body and may be coupled with the threaded ring in a torque-transmitting manner and which may be coupled with the chuck body by a locking device.

Description of the Background Art

Drill chucks of this type, which have a locking device, are known from DE 198 32 891 A1, for example. In a first specific embodiment of the drill chuck illustrated in DE 198 32 891 A1, the locking mechanism is activated in each operating state, i.e., even when the clamping jaws do not yet abut a tool shaft to be clamped. Irritation can easily be induced in a do-it-yourself enthusiast, since clicking noises, which are frequently associated with tensioning noises, occur due to the continuously activated locking device during adjustment of the clamping jaws—i.e., when the clamping jaws have not yet come into abutment with a tool shaft to be clamped. The problem thus arises that the clamping operation of the tool shaft to be clamped is, under certain circumstances, ended too soon, which may lead to an insecurely clamped tool shaft.

In another specific embodiment of the drill chuck illustrated in DE 198 32 891 A1, the engagement of the locking device takes place only at the end of the clamping operation. For this purpose, the clamping sleeve is supported on the threaded ring in a limited rotatable and axially adjustable manner, so that the clamping sleeve is rotated relative to the threaded ring and is axially adjusted when the clamping jaws come into abutment with a tool shaft to be clamped. The locking device, which is provided between the clamping sleeve and the chuck body, is then activated hereby. In this specific embodiment, however, the axial adjustability of the clamping sleeve, in particular, has proven to be disadvantageous, since a penetration of contaminants into the interior of the chuck body may not be entirely ruled out hereby. In addition, problems with regard to the stability of the locking device have also been demonstrated when using the aforementioned locking device in the upper power range. Since the axially adjustable clamping sleeve also always has a certain free play, which is also referred to as a clearance, a defined switching between a drilling configuration and a clamping configuration may not be ensured under certain circumstances.

SUMMARY OF THE INVENTION

It is therefore object of the present invention to reduce the disadvantages of the conventional art.

In an embodiment, a drill chuck is provided in that the locking device is formed by a locking sleeve which has a lock toothing and is rotatably fixedly coupled with the threaded ring and is axially movable relative to the threaded ring and the clamping sleeve between a drilling configuration and a clamping configuration; the locking device is also formed by a mating toothing assigned to the chuck body.

Due to the locking device, which is essentially formed by the lock toothing assigned to the locking sleeve and by the mating toothing assigned to the chuck body, it is easily achieved that the problematic function overload of the locking sleeve, which is known from the prior art, no longer exists, since the locking sleeve only has to be rotated and not adjusted. As a result, the drill chuck according to the invention may also be used in drilling machines in the high power segment. By rotating the clamping sleeve, the locking device may be easily moved between a drilling configuration, in which the lock toothing is in engagement with the mating toothing, and a clamping configuration, in which the toothing engagement is released.

It has also proven to be particularly advantageous if the toothing engagement provided between the lock toothing of the locking sleeve and the mating toothing is active in the axial direction. This ensures, in particular, that a tensioning of the clamping jaws remains possible in the drilling configuration, in the case of a suitable design of the mating toothing and the lock toothing, since the lock toothing may easily disengage axially from the mating toothing without intervention on the part of the user. The axial action of the locking device also ensures that the locking device always remains securely closed even under strong vibrations or in the event of high dynamics.

A tensioning is furthermore also easily facilitated thereby. Within the scope of the invention, however, a radial toothing engagement is also provided, in which a tensioning capability does not exist in the drilling configuration, however, because a disengagement of the lock toothing from the mating toothing is not possible without intervention on the part of the user.

It has also proven to be successful if an elastic restoring element acts upon the locking sleeve. This ensures, in particular, that a force acting in the direction of the mating toothing is always applied to the locking sleeve, whereby the dependability of the drill chuck according to the invention is increased. In this connection, it has proven to be particularly successful if the elastic restoring element is provided by a sinuous spring. In particular, by selecting the sinuous spring, the force needed to clamp the clamping jaws and to release the locking device—for example for tensioning—may be selectively set.

It has also proven to be advantageous if at least one control cam is assigned to the the locking sleeve, upon which a radial cam, which is assigned indirectly or directly to the clamping sleeve, may act for the purpose of axially adjusting the clamping sleeve. The locking sleeve supported on the threaded ring may thus be easily switched axially between the clamping configuration and the drilling configuration via the radial cam by rotating the clamping sleeve. A relative rotation between the threaded ring and the chuck body is possible in the clamping configuration, whereby the clamping jaws guided in the chuck body are axially adjusted. This may take place either by the drive of a drilling machine coupled with the chuck body or by the rotation of the clamping sleeve.

It has also proven to be favorable if the radial cam is delimited by at least one engagement seat which defines the drilling configuration and/or the clamping configuration. The control cam assigned to the locking sleeve may then engage with the engagement seat, whereby the locking sleeve has particular, well defined end positions. The engagement seats ensure, for example, that, when the drill chuck is adjusted from the clamping configuration to the drilling configuration—i.e., when clamping a workpiece—the control cam disengages from the engagement seat only upon reaching a certain clamping torque and is axially adjusted by the radial cam assigned indirectly or directly to the clamping sleeve in the direction of the mating toothing, whereby the toothing engagement is established. Afterward, the control cam may engage with the engagement seat defining the drilling configuration, and it is secured therein. The engagement seat also ensures that a stop surface is available in the drilling configuration, which facilitates a tensioning of the clamping jaws in connection with the control cam. During tensioning, the locking device is slightly loosened in the drilling configuration—the locking sleeve is thus moved against the elastic restoring element without intervention on the part of the user—and the clamping jaws are tensioned.

For assembly reasons, it has also proven to be favorable if the mating toothing is provided on a toothed ring assigned to the coupling element. The toothed ring may thus be easily pressed onto the coupling element and thereby simultaneously forms an axial securing system for the locking sleeve which is rotatably fixedly coupled with the threaded ring.

It is furthermore advantageous if the toothed ring is axially adjustable against a spring element supported on the chuck body. This ensures, in particular, that the toothing engagement provided between the lock toothing and the mating tooling is fully formed when the elastic restoring element acting upon the lock toothing is directed against the active direction of the toothing engagement, and clearance existing between the chuck body and the clamping sleeve partially releases the toothing engagement.

It has also proven to be favorable if the threaded ring is formed in multiple parts from a ring, which is divided in half and carries an inner thread, and a toothed sleeve, which connects the ring, divided in half, and which is rotatably fixedly connected to the locking sleeve. The threaded ring may thus be easily connected to the locking sleeve to prevent, in particular in the drilling configuration, a relative rotation between the threaded ring and the chuck body, which would result in an unwanted disengagement of the clamping jaws. The ring divided in half may also be easily inserted into a groove provided in the chuck body and then be connected to the threaded ring with the aid of the toothed sleeve. Within the scope of the invention, however, it is also provided that the ring carrying the inner thread is provided as a single piece and, in particular, that the ring and the toothed sleeve—i.e., the threaded ring—are also provided as a single piece. In an alternative specific embodiment of the invention, it is furthermore provided that the thread which is in engagement with the clamping jaws is provided as an outer thread.

For use in drilling machines of a higher power class, it has also proven to be advantageous if the lock toothing provided on the locking sleeve and the mating toothing assigned to the chuck body and corresponding to the lock toothing are formed from a plurality of locking teeth having a locking flank and a tensioning flank. The forces needed for tensioning and for emergency opening are set by suitably selecting the slopes of the locking flanges and the tensioning flanks. The steeper the slope of the locking flank, the greater the application of force needed for disengagement. In this connection, it has proven to be advantageous if the slope of the locking flank of the toothing engagement provided between the lock toothing and the mating toothing is greater than or equal to the slope of the tensioning flank. A tensioning of the drill chuck is thus always possible.

It has also proven to be advantageous if the slope of the locking flank is greater than or equal to 45°, preferably greater than 60° and especially preferably greater than 80°. Although a higher application of force is needed as the slope of the locking flank increases, in order to facilitate an emergency opening of the drill chuck according to the invention in the drilling configuration, higher dynamic influences of the drilling machine used may also be absorbed as the slope increases.

To be able to absorb the greatest possible dynamic influences of the drilling machine used, it has also proven to be advantageous if the locking flanks of the locking teeth are oriented parallel to the tensioning flanks. Due to the 90° slope resulting hereby, it may be ensured, in particular, that an unwanted unlocking and/or tensioning of the drill chuck is ruled out.

It has also proven to be favorable if the slope of the clamping jaws with regard to the chuck axis is taken from a range which is preferably between 15° and 25° and which is particularly preferably 20°. This makes it possible to implement particularly compact drill chucks, whereby the top-heaviness of a drilling machine equipped with the drill chuck is reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 17 shows a toothing engagement with detail XVIII;

FIGS. 18.1 through 18.4 show detail XVIII from FIG. 17 in toothing engagements of different designs;

FIGS. 21.1 through 21.3 show longitudinal sectional views along section XXI-XXI from FIG. 20 in additional specific embodiments of the drill chuck according to the invention;

FIGS. 23.1 through 23.3 show different views of a drill chuck in the clamping configuration;

FIGS. 24.1 through 24.3 show different views of a drill chuck in the drilling configuration;

FIG. 27 shows a side view of the drill chuck having trapezoidal clamping jaws;

FIG. 28 shows a sectional view along section XXVIII-XXVIII from FIG. 27; and

FIG. 29 shows a perspective view of the chuck body from direction XXIX in FIG. 27.

DETAILED DESCRIPTION

Figure 1:
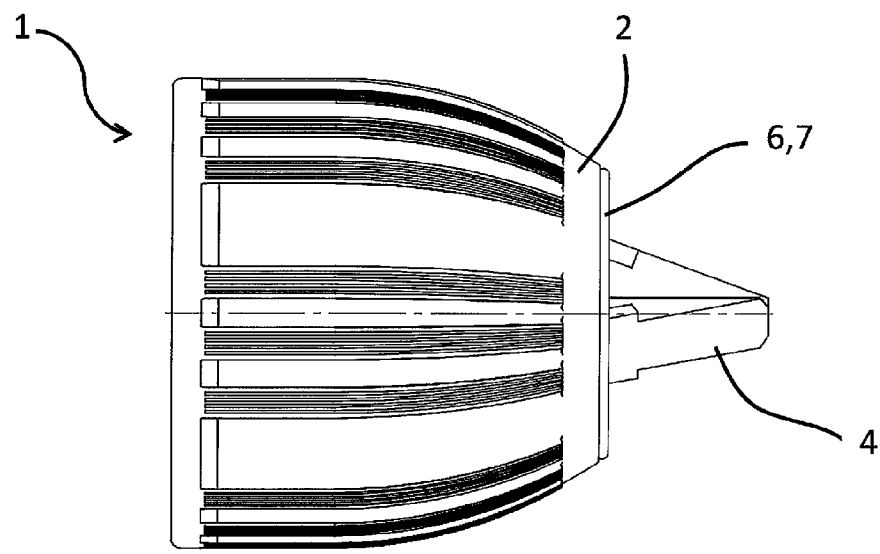
FIG. 1 shows a side view of a first specific embodiment of the drill chuck according to the invention.

FIG. 1 shows a side view of a first specific embodiment of drill chuck 1 according to the invention. In addition to clamping sleeve 2, which surrounds a drill chuck 3 not illustrated in the drawing, FIG. 1 also shows clamping jaws 4, which are guided in guide receptacles 5 in chuck body 3. On the front side facing clamping jaws 4, clamping sleeve 2 is axially secured by a securing sleeve 7 having an annular band 6.

Figure 2:
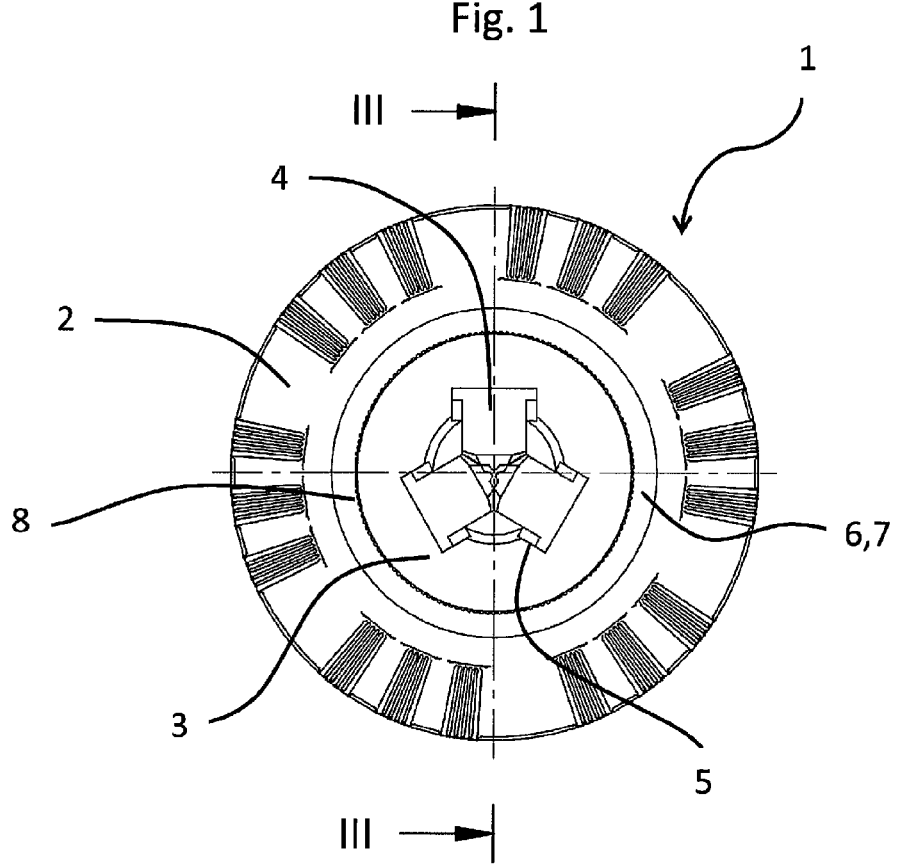
FIG. 2 shows a top view of the drill chuck, with the clamping jaws closed.

FIG. 2 shows a top view of the end of drill chuck 1 having clamping jaws 4. In addition to clamping sleeve 2, the top view illustrated in FIG. 2 shows, in particular, chuck body 3 and securing sleeve 7, which is pressed onto chuck body 3 with the aid of toothing 8 provided on the inner circumferential side and which axially secures clamping sleeve 2 with the aid of annular band 6. In addition, chuck body 3 is reinforced in the front part by securing sleeve 7.

Figure 3:
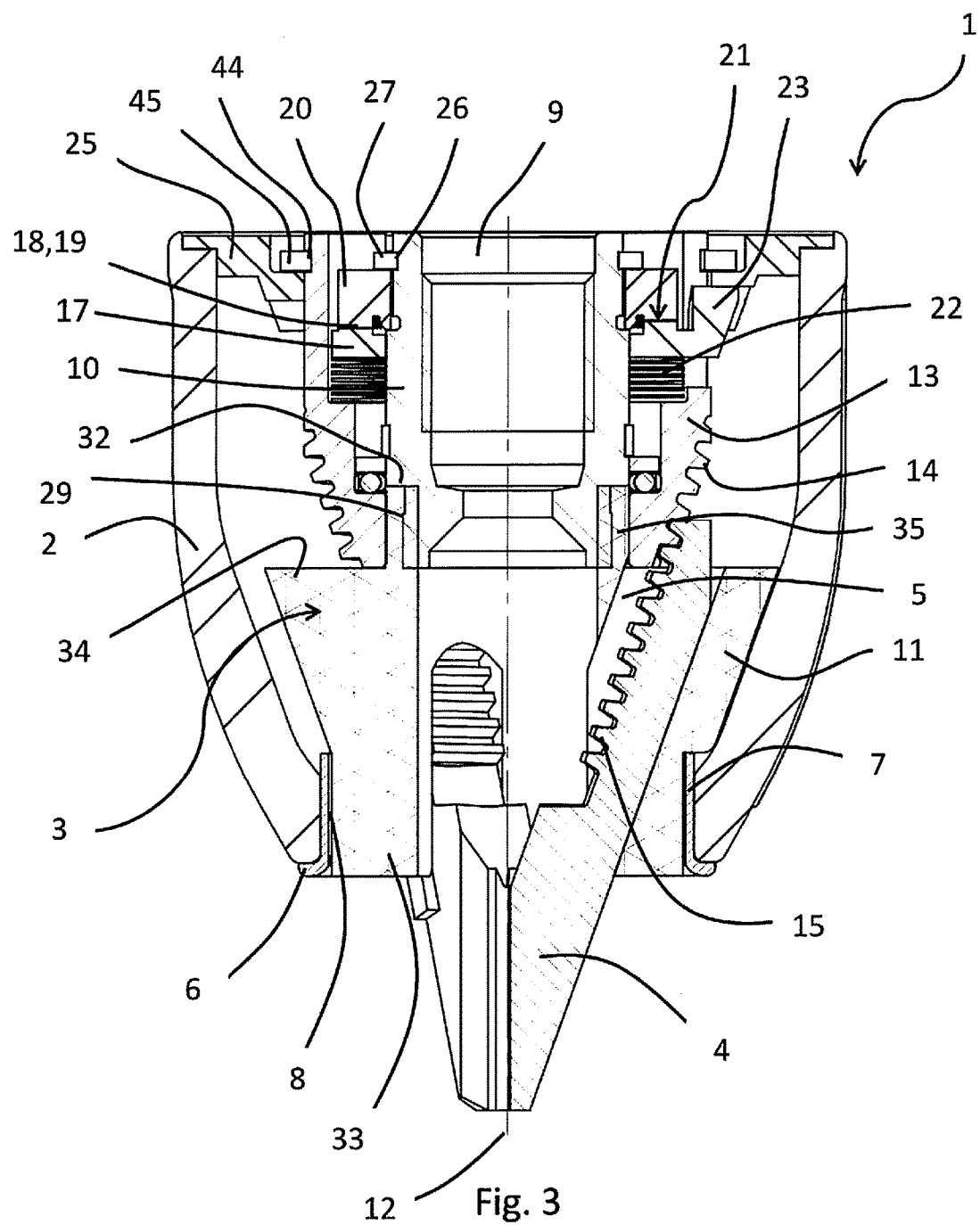
FIG. 3 shows a longitudinal sectional view along section III-III from FIG. 2.

FIG. 3 shows, in a longitudinal section, a sectional view of the first specific embodiment along section III-III from FIG. 2. Note that chuck body 3 is formed in multiple parts from a coupling part 10 having a spindle receptacle 9 and a jaw guiding part 11 manufactured from plastic, in which guide receptacles 5 run, inclined toward chuck axis 12, for the purpose of guiding clamping jaws 4. To adjust clamping jaws 4, a threaded ring 13 is provided in the illustrated exemplary embodiment, which is in engagement with series of teeth 15 assigned to clamping jaws 4, with the aid of an outer thread 14. An axially movable locking sleeve 16, which is rotatably fixedly connected to threaded ring 13, is supported thereon and is also referred to as locking ring 17 in the first specific embodiment. Locking ring 17 has an axially acting lock toothing 18 for forming a toothing engagement with a mating toothing 19 assigned to chuck body 3. In the illustrated exemplary embodiment, mating toothing 19 is provided on a toothed ring 20 assigned to coupling element 10. Due to lock toothing 18 and mating toothing 19 corresponding thereto, a locking device 21 is provided, with the aid of which chuck body 3 may be rotatably fixedly connected to threaded ring 13 for the purpose of preventing unintentional disengagement of clamping jaws 4. Locking ring 17, which is axially movably mounted on threaded ring 13, is supported on threaded ring 13 via an elastic restoring element 22.

To adjust locking ring 17 from the clamping configuration, in which lock toothing 18 of locking ring 17 is out of engagement with mating toothing 19 assigned to toothed ring 20, into the drilling configuration, in which the toothing engagement between lock toothing 18 and mating toothing 19 is established, a control cam 23 is assigned to locking ring 17, upon which a radial cam 24 may act, which is provided on a terminating disk 25 assigned to clamping sleeve 2. In the illustrated exemplary embodiment, radial cam 24 provided in terminating disk 25 is delimited by an engagement seat 28 defined by the drilling configuration and the clamping configuration. By rotating clamping sleeve 2, locking device 21 is easily adjusted between the drilling configuration and the clamping configuration. The slope of clamping jaws 4 with respect to chuck axis 12 is 20° in the illustrated exemplary embodiment, which results in a very compact drill chuck. To secure toothed ring 20, a first securing groove 26 is assigned to coupling part 10, into which a first retaining ring 27 is inserted, which fixes the axial position of toothed ring 20. Terminating disk 25 in the illustrated exemplary embodiment is rotatably fixedly connected to clamping sleeve 2 and axially secured by a second retaining ring 45, which is inserted into a second securing groove 44, which is provided in threaded ring 13.

Figure 4:
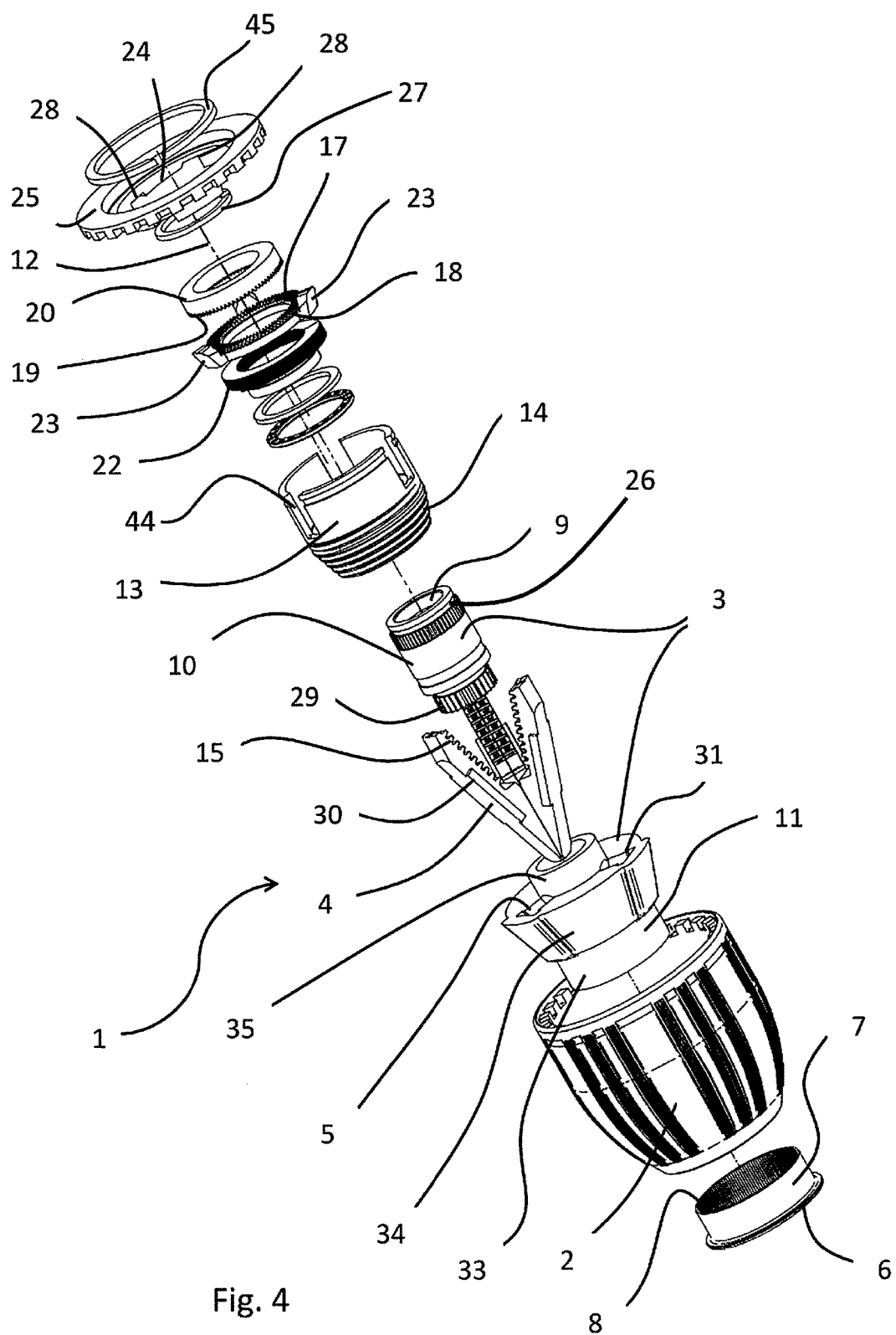
FIG. 4 shows an exploded view of the first specific embodiment.
Figure 5:
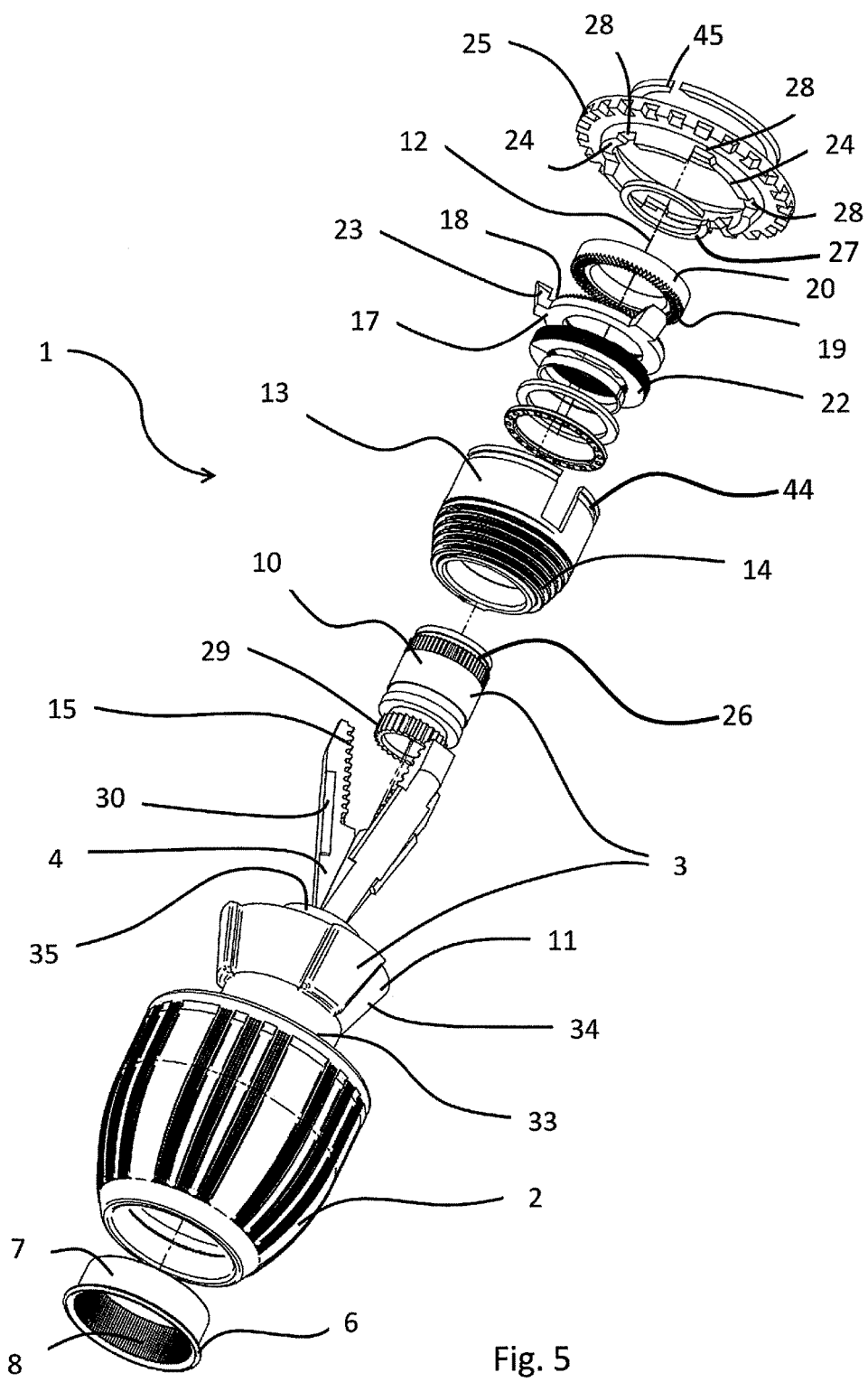
FIG. 5 shows another exploded view of the first specific embodiment.

FIG. 4 and FIG. 5 each show an exploded view of the first specific embodiment of drill chuck 1 according to the invention, from different perspectives. In particular, FIG. 4 shows two-part chuck body 3, which is formed from coupling part 1, manufactured from metal, and jaw guiding part 11, manufactured from plastic. A securing structure 29, into which jaw guiding part 11 is pressed during assembly and additionally injection-molded, is assigned to coupling part 10 for the purpose of coupling with jaw guiding part 11. Clamping jaws 4 used in the illustrated exemplary embodiment are designed as flat jaws and each have a guide profile 30 on the side facing away from row of teeth 15, which has a rectangular cross section in the illustrated exemplary embodiment and may be inserted into guide grooves 31, which are provided in jaw guiding part 11 molded from plastic in the area of guide receptacles 5.

Figure 6:
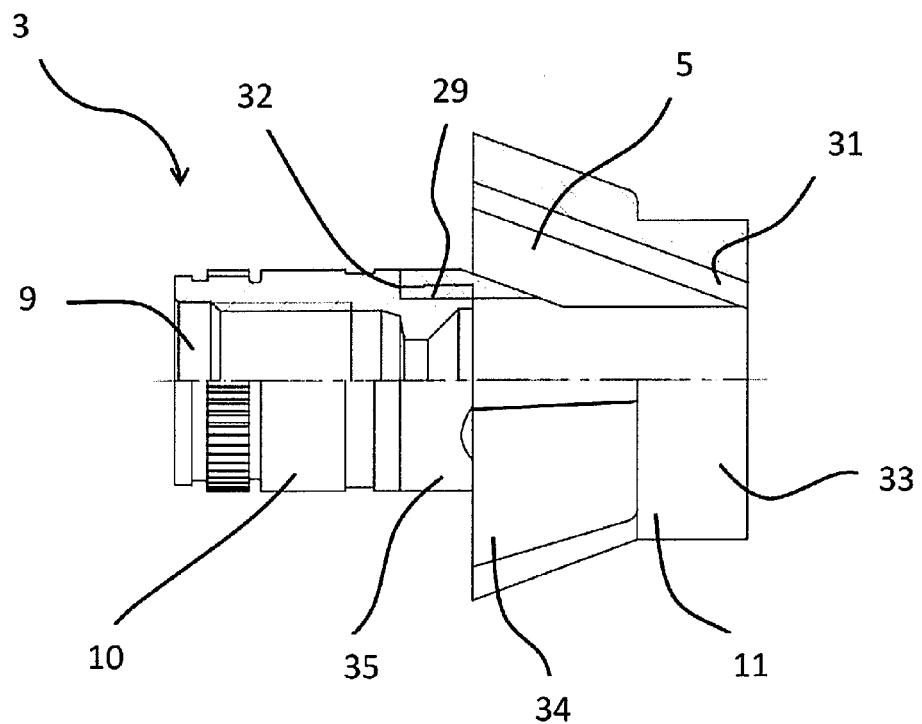
FIG. 6 shows a partial sectional view of the chuck body of the first specific embodiment.

FIG. 6 shows a partial sectional view of chuck body 3 of the first specific embodiment of drill chuck 1 according to the present invention, formed from coupling part 10 and jaw guiding part 11. The view illustrated in FIG. 5 shows that securing structure 29, which is provided on coupling part 10, is axially delimited by a collar 32. This ensures a defined fit during the joining of chuck body 3. FIG. 6 furthermore shows guide receptacles 5, which are inclined toward chuck axis 12 and are provided for guiding clamping jaws 4 and have guide grooves 31, into which guide profiles 30 provided on the clamping jaws may be inserted. As is apparent in particular from FIG. 7, a secure guiding of the clamping jaws is ensured hereby. The three-part structure of jaw guiding part 11 is also apparent from FIG. 6. On the end facing away from coupling part 10, jaw guiding part 11 has a cylindrical first partial section 33, onto which a frustoconical second partial section 34 is molded, in which the guide receptacles of the clamping jaws are provided. A cylindrical third partial section 35 is provided on the end of jaw guiding part 11 facing coupling part 10, which is used to couple jaw guiding part 11 to coupling part 10.

Figure 7:
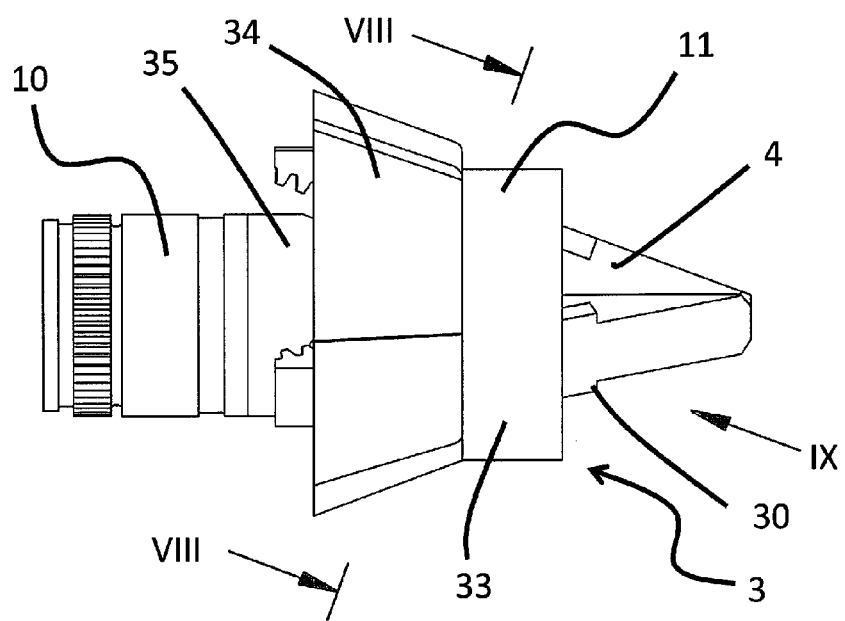
FIG. 7 shows a side view of the chuck body.
Figure 8:
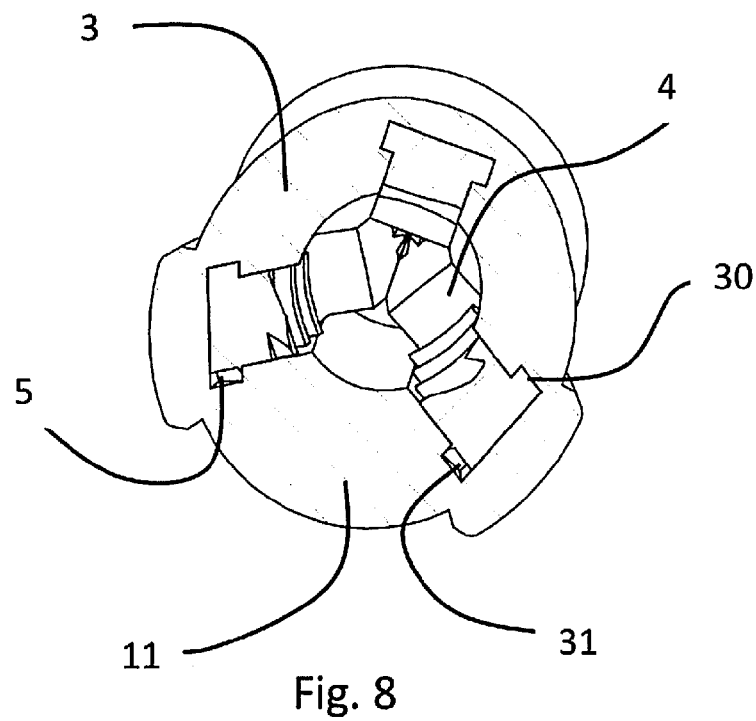
FIG. 8 shows a sectional view along section VIII-VIII from FIG. 7.

FIG. 8 shows a sectional view along section VIII-VIII from FIG. 7. Guide grooves 31 provided in guide receptacles 5 are again apparent, which are used as guides for guide profiles 30 of clamping jaws 4. A tilting of clamping jaws 4 toward the inside or toward the outside is effectively prevented by guide grooves 31 and guide profiles 30 corresponding thereto.

Figure 9:
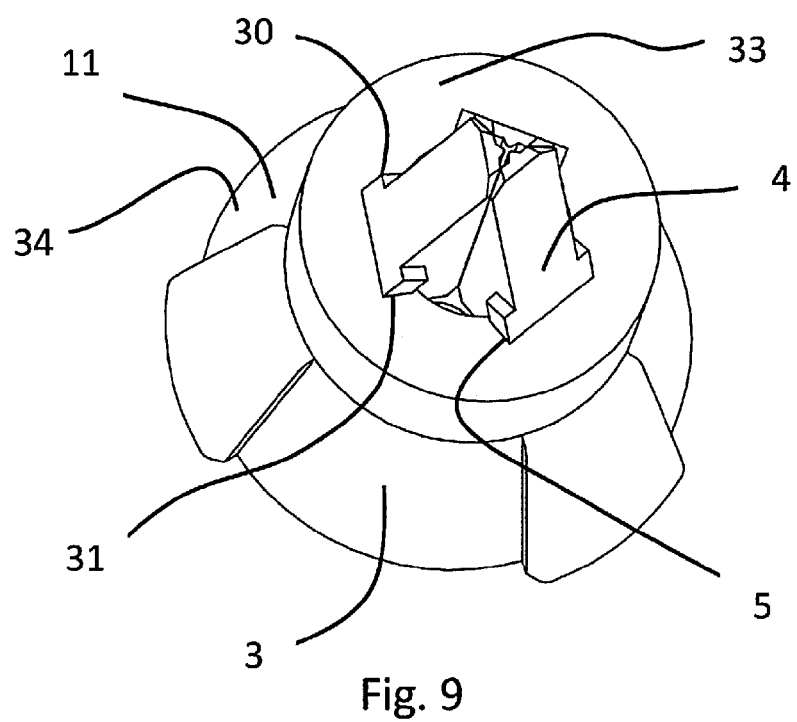
FIG. 9 shows a perspective view of the chuck body.

FIG. 9 also shows that the diameter of frustoconical second partial section 34 is locally enlarged in the area of guide receptacles 5 accommodating clamping jaws 4. In particular, the fact that the wall thickness of jaw guiding part 11 remains homogeneous is achieved hereby, whereby manufacturing-induced stresses frequently occurring during the cooling of plastic are avoided.

Figure 10:
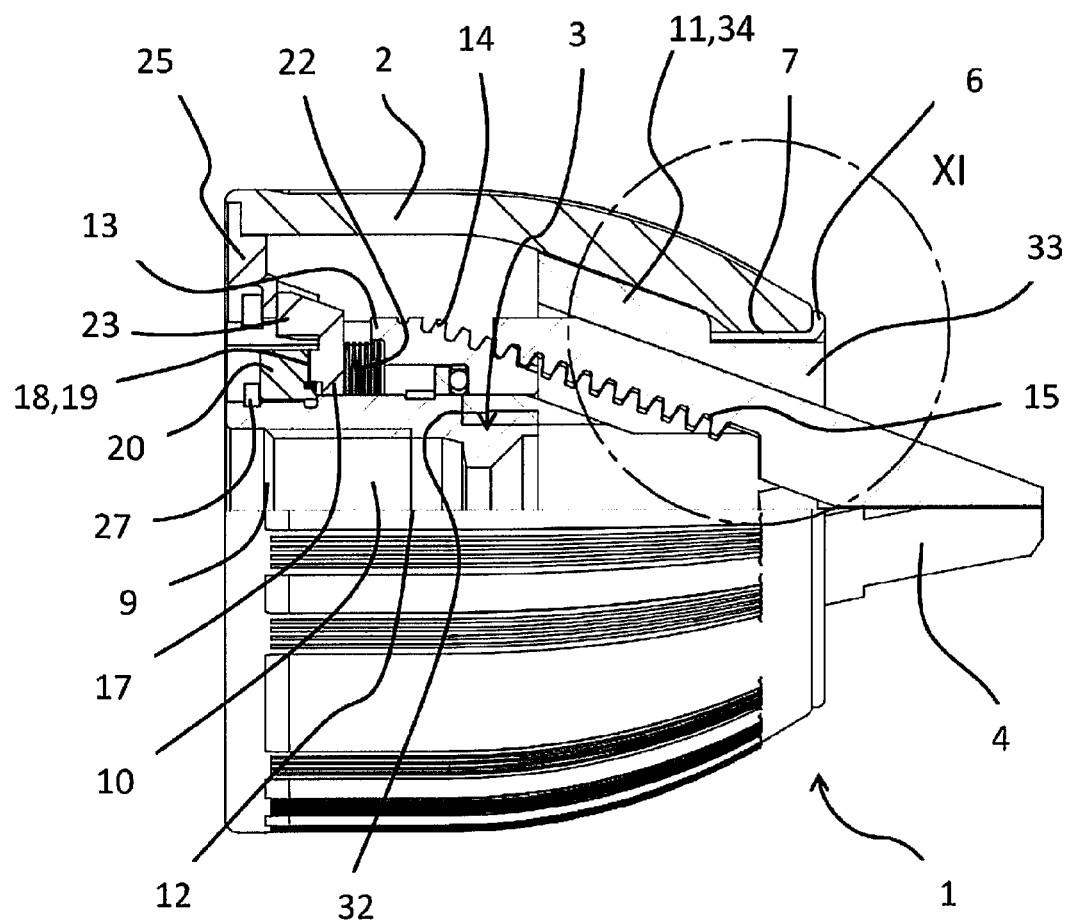
FIG. 10 shows a partial sectional view of the chuck body according to the invention.
Figure 11:
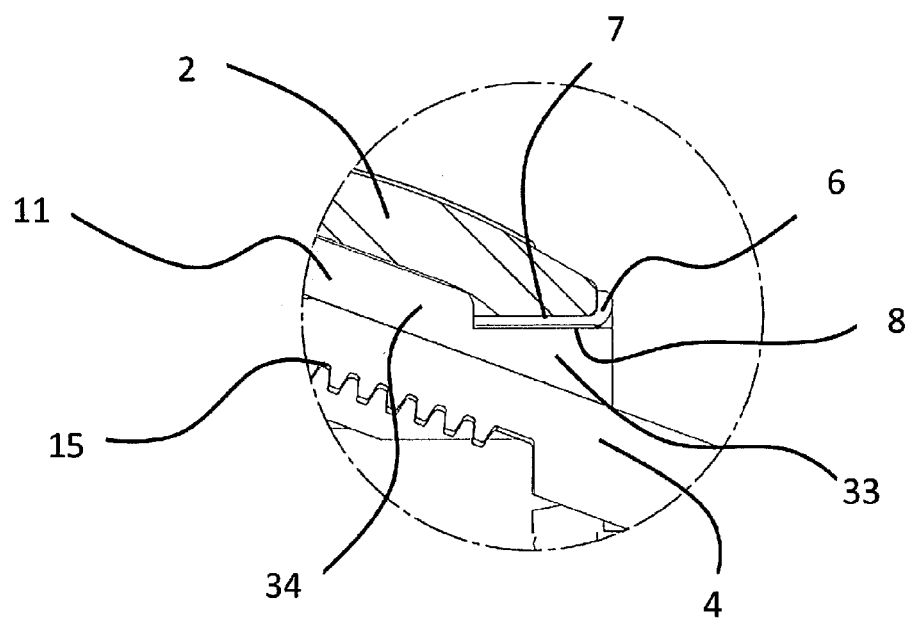
FIG. 11 shows detail XI from FIG. 10.

FIG. 10 shows a partial sectional view of a first specific embodiment of drill chuck 1 according to the invention in the drilling configuration. Lock toothing 18 of locking ring 17 is in toothing engagement with mating toothing 19, which is assigned to chuck body 3. As is apparent, in particular, from Detail XI illustrated in FIG. 11, securing sleeve 7 is mounted on the end of clamping sleeve 2 facing away from the terminating disk, pressed onto cylindrical first partial section 33 of jaw guiding part 11 with the aid of toothing 8 provided on the inner circumferential side and reinforces it locally. It is also apparent from Detail XI that clamping sleeve 2 is axially secured by annular band 6, which is assigned to securing sleeve 7.

Figure 12:
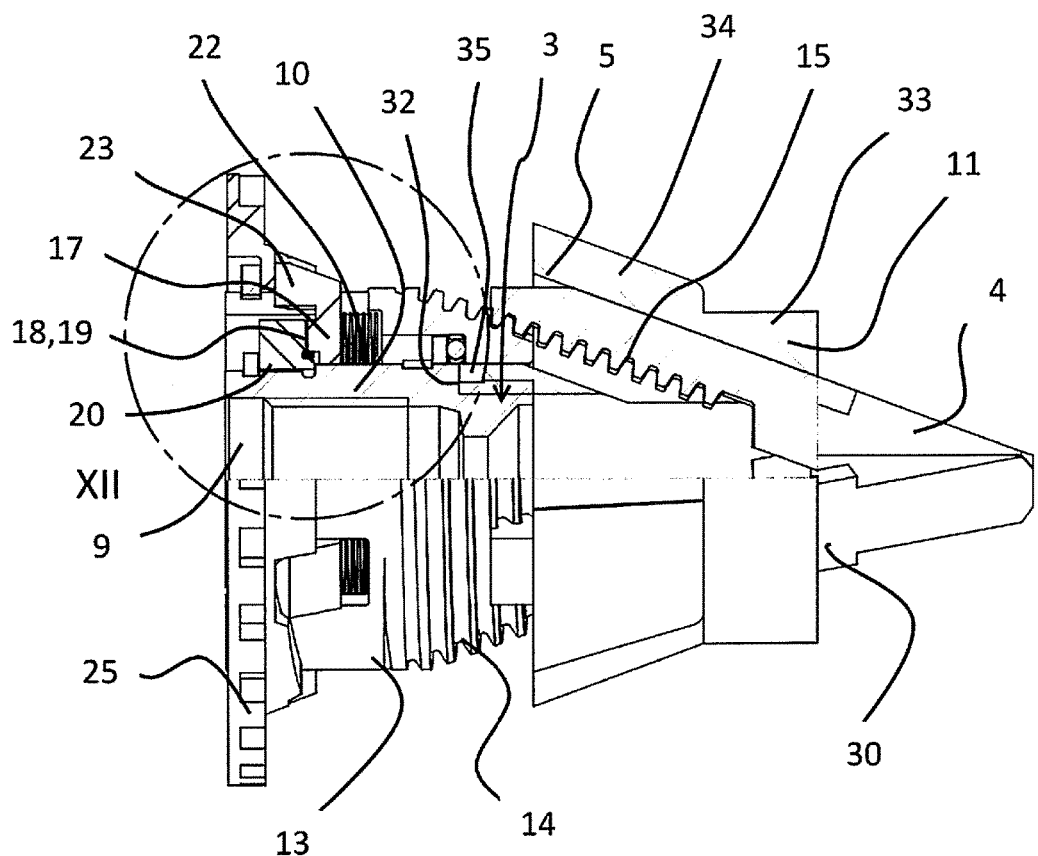
FIG. 12 shows a partial view of the first specific embodiment.
Figure 13:
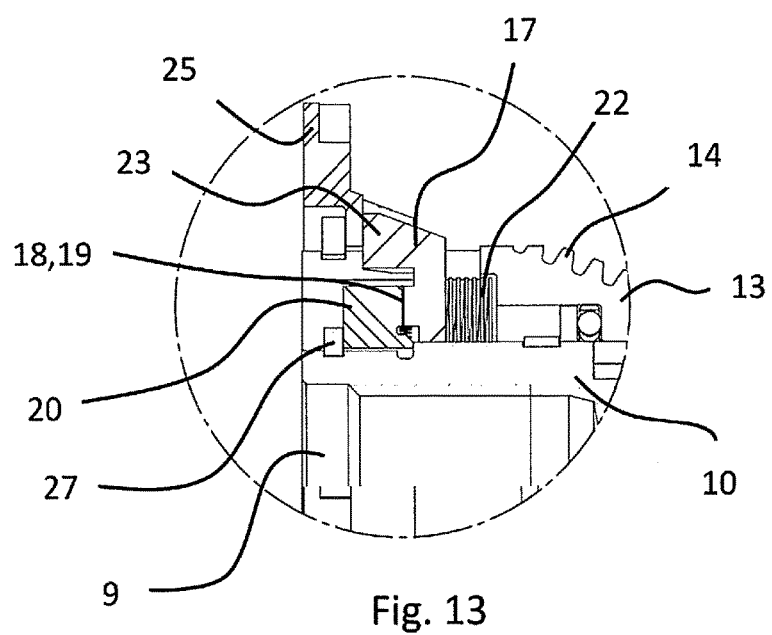
FIG. 13 shows detail XIII from FIG. 12 in the drilling configuration.

FIG. 12 and Detail XIII illustrated in FIG. 13 show that, in the drilling configuration, which is illustrated in the drawing, the toothing engagement between lock toothing 18 and corresponding mating toothing 19 is established, and control cam 23 is engaged with engagement seat 28 defining the drilling configuration.

Figure 14:
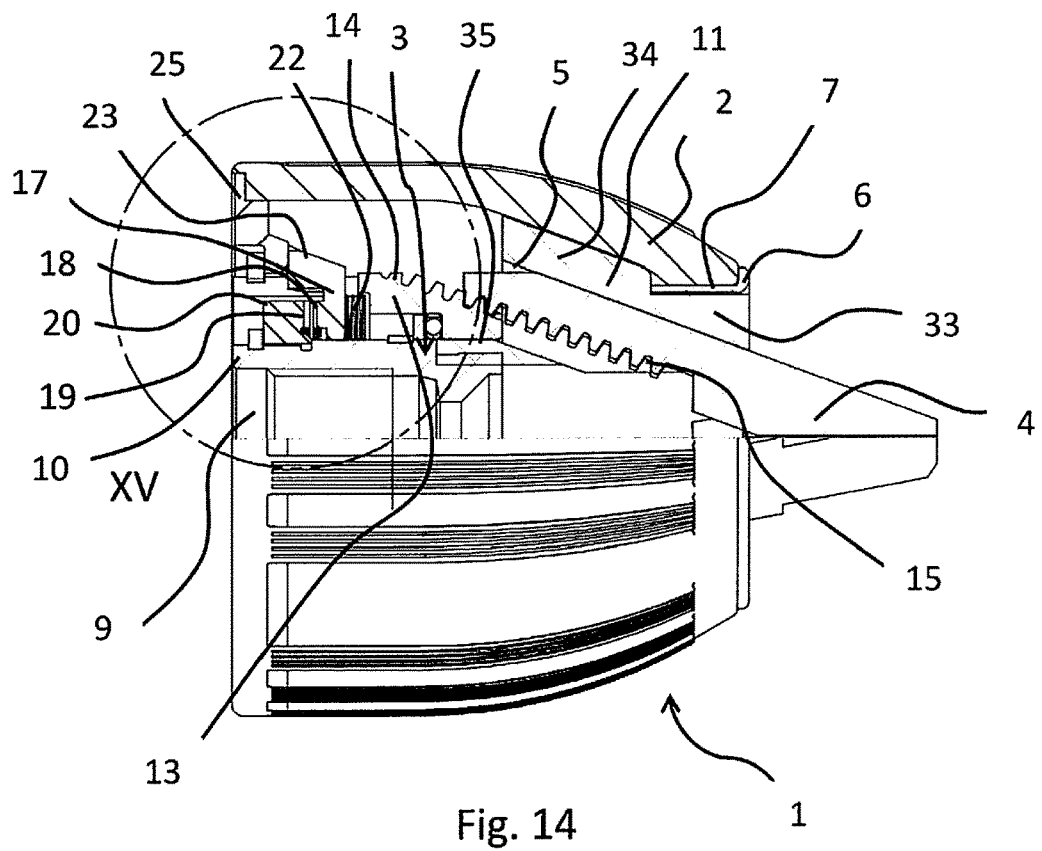
FIG. 14 shows a partial sectional view of the first specific embodiment in the clamping configuration.
Figure 15:
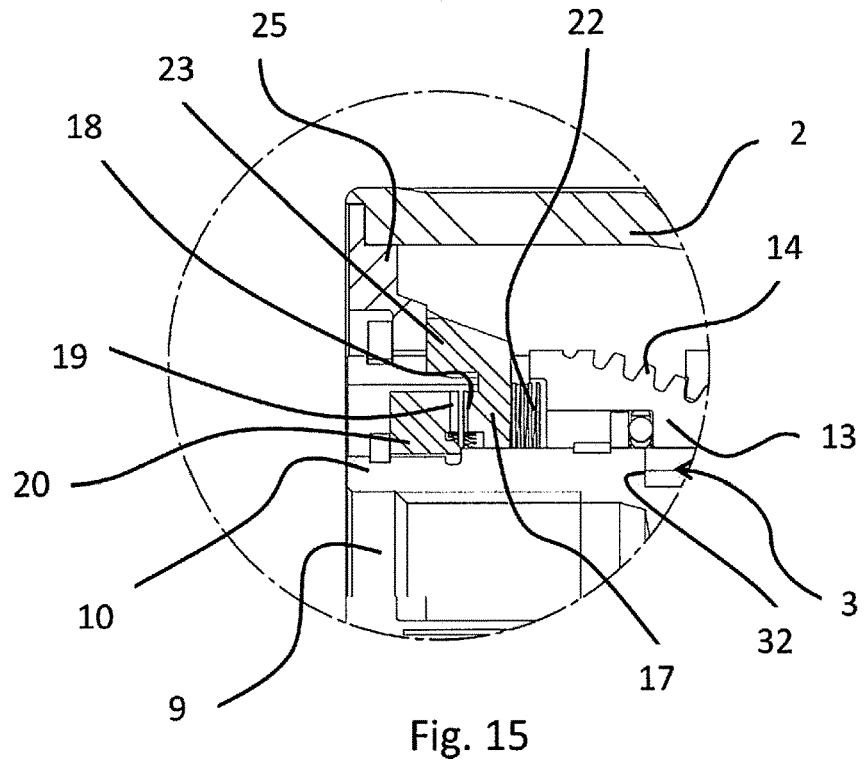
FIG. 15 shows detail XV from FIG. 14.

In the clamping configuration, which is illustrated in FIG. 14—as is apparent, in particular, in Detail XV illustrated in FIG. 15—the clamping engagement between lock toothing 18 and mating toothing 19 assigned to chuck body 3 is released. Locking ring 17 is adjusted in the direction of the clamping jaws, along threaded ring 13 by radial cam 24 provided on terminating disk 25, against elastic restoring element 22. Control cam 23 is inserted into engagement seat 28 defining the clamping configuration.

Figure 16:
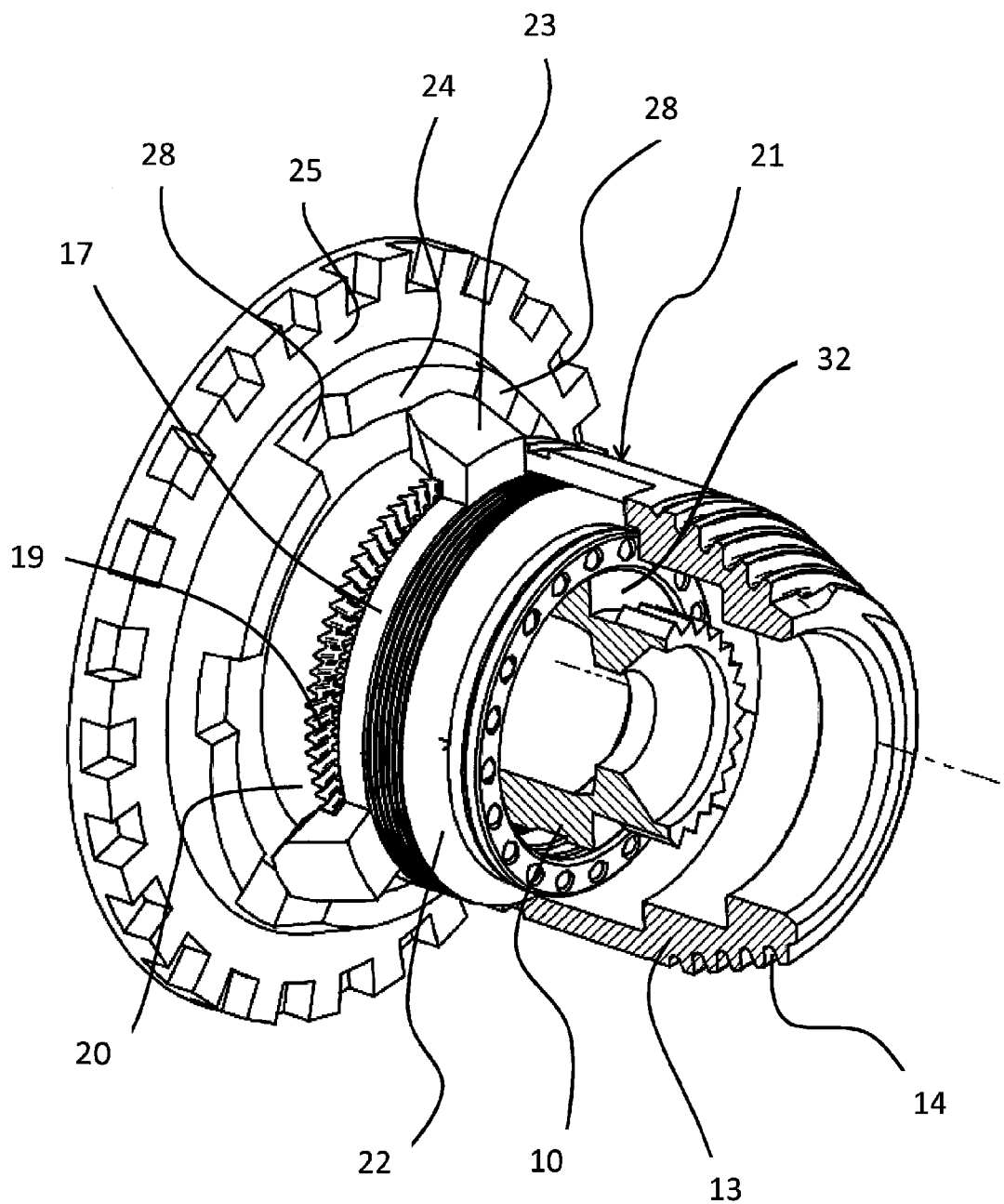
FIG. 16 shows a partial sectional view of the back end of the first specific embodiment.

FIG. 16 shows important parts of locking device 21 in a partial sectional view. In particular, the design of engagement seats 28 provided in terminating disk 25 should be noted, with which control cam 23 is engaged in the drilling configuration or in the clamping configuration, as well as radial cams 24 delimited by engagement seats 28.

Locking ring 17 is illustrated in FIG. 17, which is in engagement with mating toothing 19 assigned to toothed ring 20 [of] chuck body 3 with the aid of lock toothing 18. With Detail XVIII from FIG. 17, FIGS. 18.1 through 18.4 show different shapes of lock toothings 18 and corresponding mating toothings 19. The variants of lock toothing 18 and mating toothing 19 illustrated in FIGS. 18.1 through 18.4 are always formed from a plurality of locking teeth 36, which each have a locking flank 37 and a tensioning flank 38. The slope of locking flank 37 in FIGS. 18.1 through 18.4 is always equal to or greater than the slope of tensioning flank 38, which is always 45° in FIGS. 18.1 through 18.3. The slope of locking flank 37 is 80° in FIG. 18.1, 60° in FIGS. 18.2 and 45° in FIG. 18.3. The steeper the slope of locking flank 37, the more force needs to be applied to ensure an emergency opening of locking device 21. Due to the rather flat slope of tensioning flank 38, a tensioning of drill chuck 1 in the drilling configuration is possible with a relatively light application of force. In the locking teeth illustrated in FIG. 18.4, locking flank 37 is parallel to tensioning flank 38 and has a slope of 90°. In this case, neither a tensioning nor an emergency opening of locked drill chuck 1 is possible.

Figure 19:
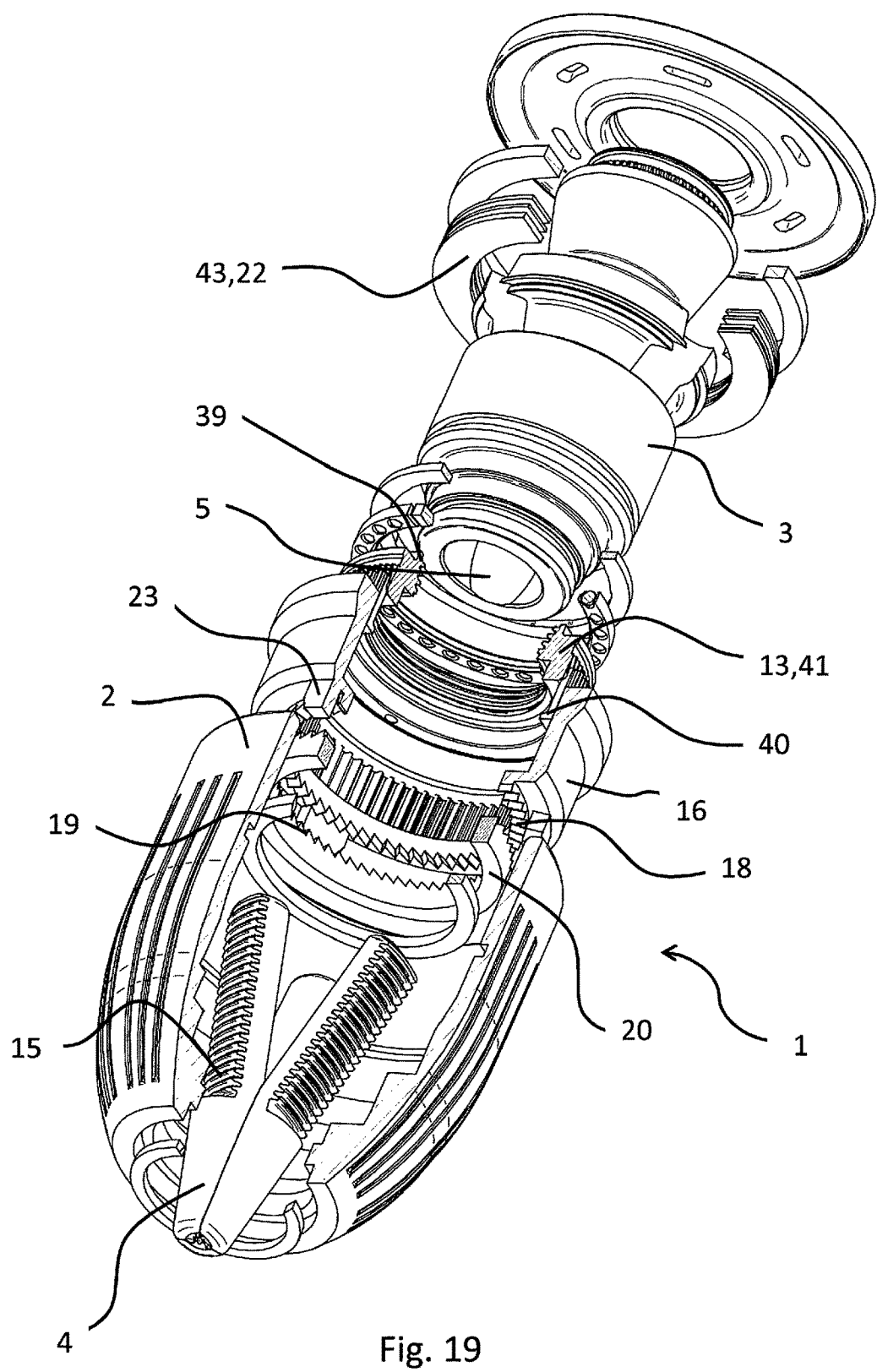
FIG. 19 shows an exploded view of another specific embodiment of the drill chuck according to the invention.

FIG. 19 shows a second specific embodiment of drill chuck 1 according to the invention, in which chuck body 3 is formed from a single piece. To adjust clamping jaws 4, which are guided in guide receptacles 5 of chuck body 3, threaded ring 13 is provided, which is in engagement with rows of teeth 15 provided on clamping jaws 4, with the aid of an inner thread 39. A toothed sleeve 40, which is rotatably fixedly coupled with locking sleeve 16, is disposed on the outer circumferential side of threaded ring 13. Locking sleeve 16 itself is axially movable on toothed sleeve 40. In the illustrated exemplary embodiment, control cams 23, upon which radial cams 24 provided on clamping sleeve 2 may act, are provided on locking sleeve 16. Once again, radial cams 24 are each delimited by engagement seats 28, which define the drilling configuration and the clamping configuration. Locking sleeve 16 may thus be axially adjusted against elastic restoring element 22, which is designed as a sinuous spring 43, by rotating clamping sleeve 2, and thereby switch between the clamping configuration and the drilling configuration. Starting in the drilling configuration and with clamping jaws 4 closed, the toothing engagement between lock toothing 18, locking sleeve 16 and mating toothing 19 assigned to toothed ring 20 is first released. A relative rotation, limited by engagement seats 28, between clamping sleeve 2 and locking sleeve 16 occurs, and control cams 23 engage with engagement seats 28 defining the clamping configuration. Drill chuck 1 is now in the clamping configuration. If the drive of a drilling machine coupled with drill chuck 1 is now actuated, or if the clamping sleeve continues to be adjusted manually in this configuration, a relative rotation of threaded ring 13 and chuck body 3 occurs, whereby clamping jaws 4 guided in chuck body 3 are opened.

Figure 20:
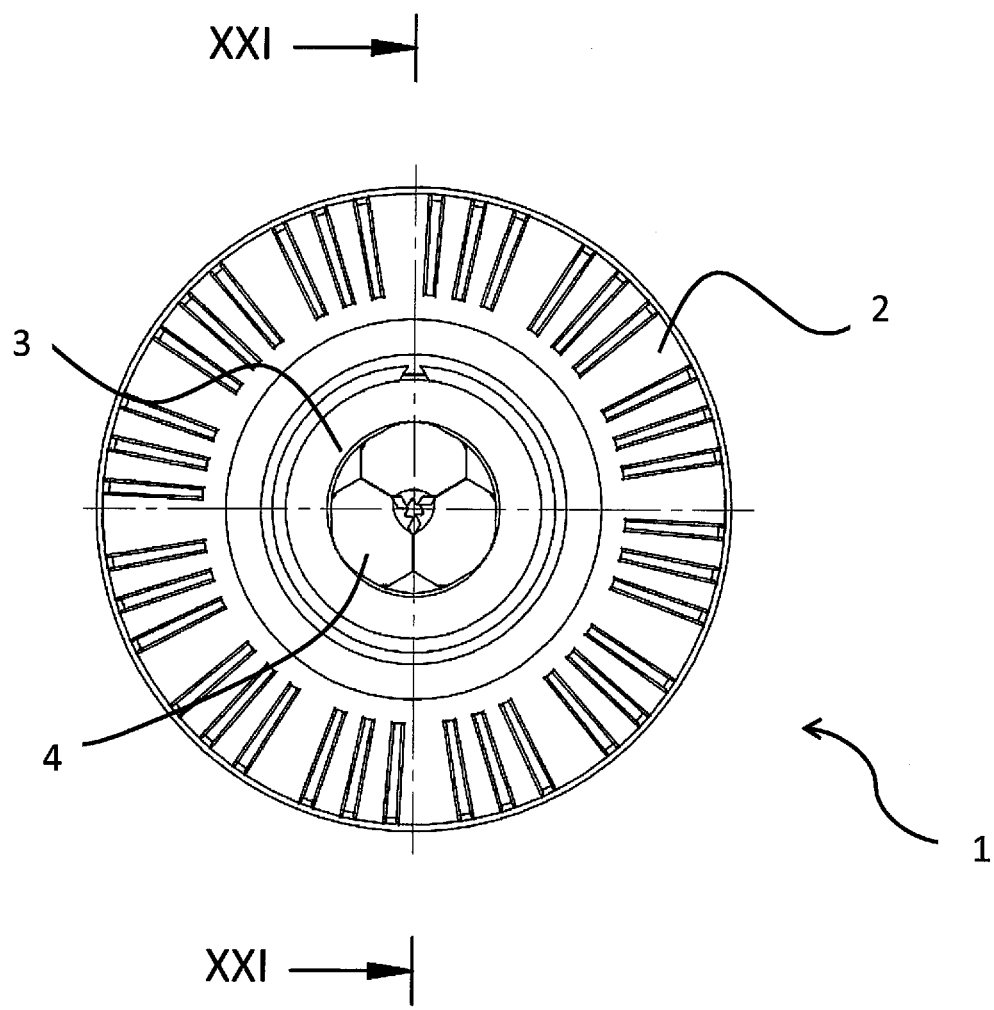
FIG. 20 shows a top view of a drill chuck.

A top view of drill chuck 1 according to the invention, with clamping jaws 4 closed, is apparent in FIG. 20. FIG. 21.1 shows a longitudinal sectional view along section XXI-XXI of the second specific embodiment illustrated in FIG. 20. It is apparent, in particular, from the sectional view that threaded ring 13 is formed in multiple parts from a ring 41, which is divided in half and carries inner thread 39, and from toothed sleeve 40, which connects ring 41 divided in half. In the illustrated exemplary embodiment, toothed sleeve 40 is disposed in such a way that elastic restoring element 22 always adjusts locking sleeve 16 against toothed ring 20, whereby the toothing engagement provided between lock toothing 18 and corresponding mating toothing 19 is reinforced.

A third specific embodiment of drill chuck 1 according to the invention is shown in the sectional view illustrated in FIG. 21.2 along section XXI-XXI from FIG. 20. The axial arrangement of mating toothing 19, which is assigned to toothed ring 20, and lock toothing 18, is reversed herein. However, the toothing engagement in the third specific embodiment, which is illustrated in FIG. 21.2, is slightly impaired, due to the axial clearance of clamping sleeve 2, since elastic restoring element 22 presses lock toothing 18 out of the toothing engagement in the drilling configuration.

In a fourth specific embodiment, which is illustrated in FIG. 21.3, a spring element 42 supported on the chuck body acts axially upon toothed ring 20 to eliminate the existing clearance and reinforce the toothing engagement.

Figure 22:
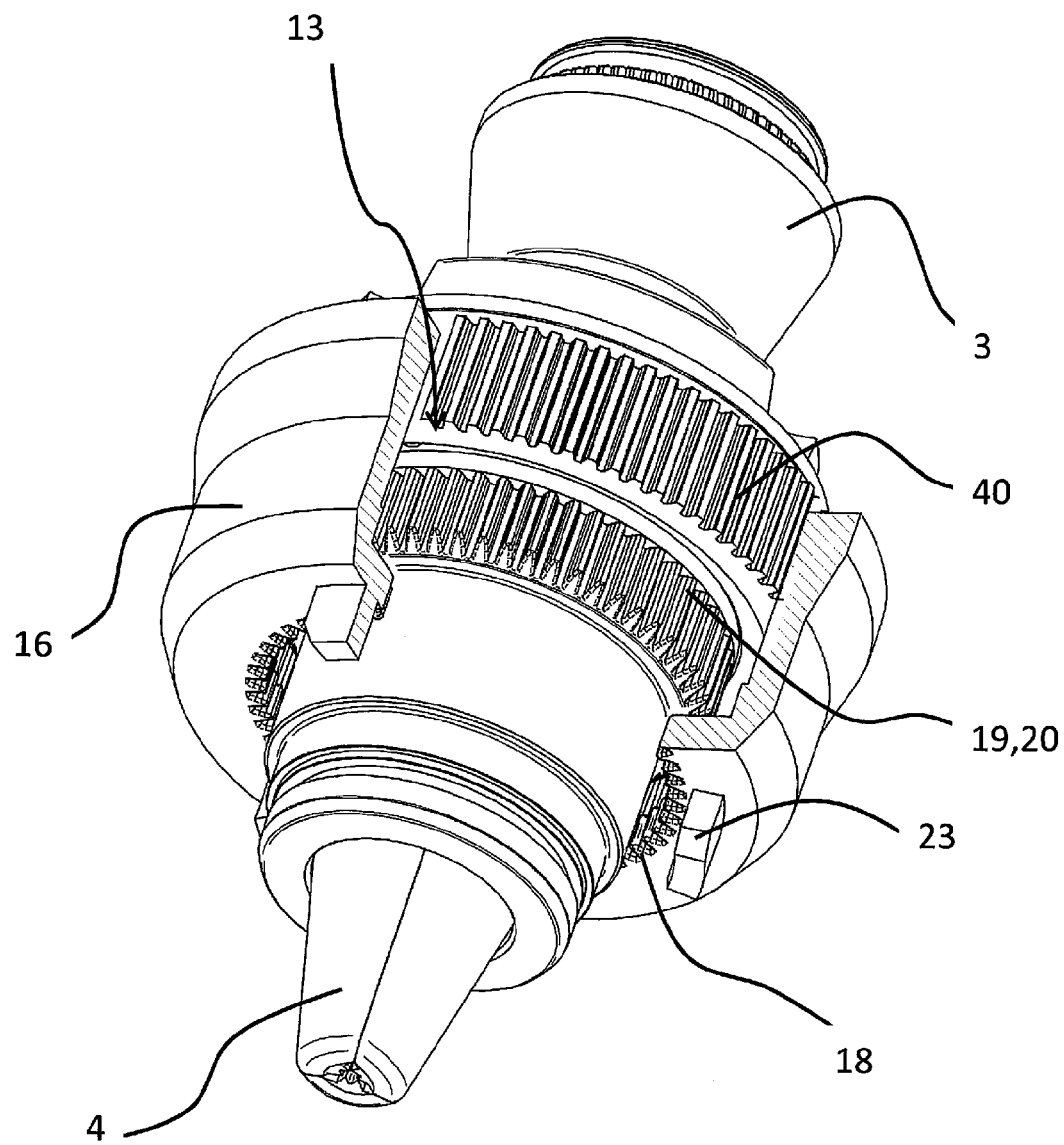
FIG. 22 shows a partial sectional view of a fifth specific embodiment of the drill chuck according to the invention.

FIG. 22 shows a fifth exemplary embodiment of drill chuck 1 according to the invention, in which locking device 21 operates in the radial direction. As is apparent from FIG. 22, mating toothing 19 assigned to chuck body 3 is oriented radially. Due to the axial adjustment of locking sleeve 16, which is guided on threaded ring 13 via toothed sleeve 40, threaded ring 13 may again be rotatably fixedly coupled with chuck body 4 in the manner described above.

FIGS. 23.1 through 23.3 show a partial sectional view of the third specific embodiment of drill chuck 1 according to the invention in the clamping configuration. FIG. 23.1 shows a perspective view, FIG. 23.2 shows a top view and FIG. 23.3 shows a side view of the partially sectional third specific embodiment. As is apparent, in particular, in FIG. 23.1 and FIG. 23.3, control cams 23 assigned to locking sleeve 16 are engaged with engagement seats 28, which define the clamping configuration and are provided in the clamping sleeve. Engagement seats 28 which define the clamping configuration are lower than engagement seats 28 which define the drilling configuration.

If a tool shaft is to be clamped when clamping jaws 4 are spread apart, clamping jaws 4 guided in chuck body 3 are adjusted by a relative rotation between chuck body 3 and threaded ring 13, which is in engagement with clamping sleeve 2 via locking sleeve 16. When clamping jaws 4 come into abutment with the tool shaft to be clamped, control cams 23, which are assigned to locking sleeve 16, are adjusted from engagement seats 28 defining the clamping configuration and transferred to engagement seats 28 defining the drilling position along radial cams 24 provided on clamping sleeve 2 and adjusted axially against elastic restoring element 22. Control cams 23 engage with the engagement seats defining the drilling configuration, and the drill chuck is now in the drilling configuration illustrated in FIGS. 24.1 through 24.3. The toothing engagement between lock toothing 18 and corresponding mating toothing 19 is closed, and a relative rotation between threaded ring 13 and chuck body 3 is thus ruled out.

Figure 25:
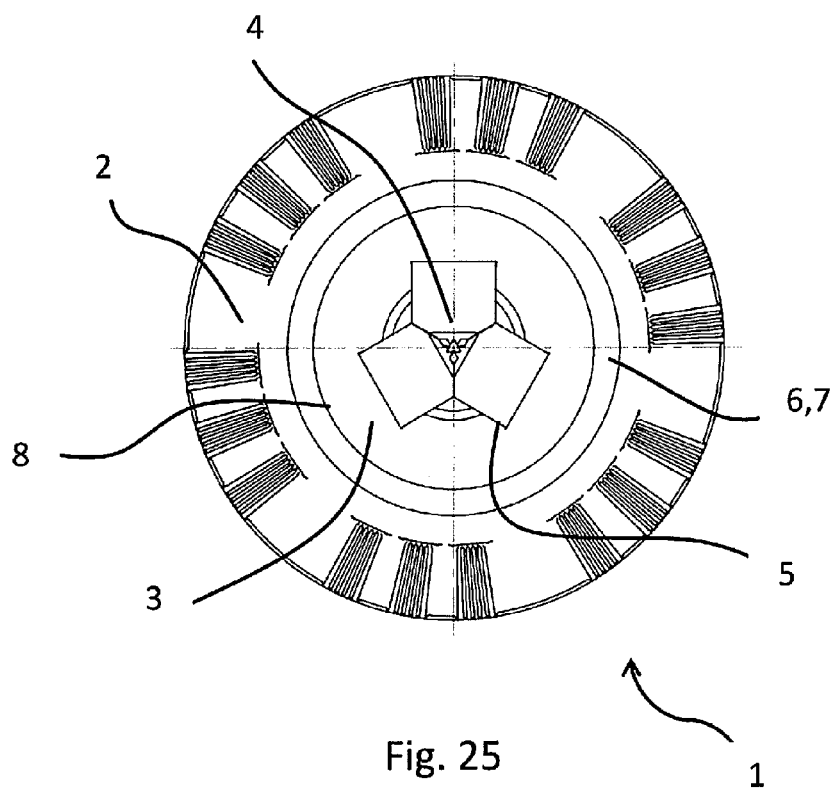
FIG. 25 shows a top view of another specific embodiment, including trapezoidal clamping jaws.
Figure 26:
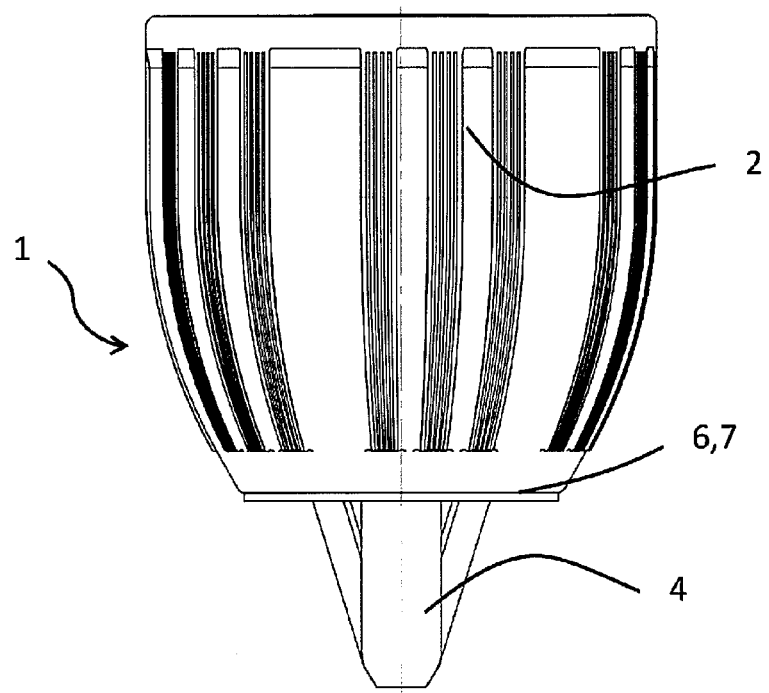
FIG. 26 shows a side view of the drill chuck from FIG. 25.

FIG. 25 shows a side view of another specific embodiment of drill chuck 1 according to the invention, including trapezoidal clamping jaws 4. Clamping jaws 4 are again guided in guide receptacles 5, which are provided in chuck body 3. A side view of the additional specific embodiment of the drill chuck having trapezoidal clamping jaws 4 is illustrated in FIG. 26. In particular, annular band 6 of securing sleeve 7 pressed onto chuck body 3, which axially secures clamping sleeve 2, is apparent herein.

FIG. 27 shows a side view of chuck body 3 having trapezoidal clamping jaws 4, which are guided in jaw guiding part 11 of chuck body 3.

In particular, the trapezoidal cross section of clamping jaws 4 and the corresponding cross section of guide receptacles 5 provided in jaw guiding part 11 are apparent from the sectional view of chuck body 3 illustrated in FIG. 28 along section XXVIII-XXVIII from FIG. 27. In particular, a titling of clamping jaws 4 is prevented by the trapezoidal cross section of clamping jaws 4, used as guide profile 30, and the corresponding shape of guide receptacles 5, which act as guide grooves 31.

As is also apparent from the perspective view of chuck body 3 illustrated in FIG. 29, in this specific embodiment jaw guiding part 11 is also locally enlarged in the area of guide receptacles 5 accommodating trapezoidal clamping jaws 4, i.e., in the frustoconical, second partial section 34.

The operation of the drill chuck according to the invention is explained once again below.

In the clamping position, locking sleeve 16/locking ring 17 is adjusted axially against elastic restoring element 22, and lock toothing 18 is not in engagement with mating toothing 19. Control cam 23 is engaged with engagement seat 28 defining the clamping configuration. If the user actuates the drive of a drilling machine connected to drill chuck 1, a relative rotation occurs between chuck body 3 and threaded ring 13, whereby clamping jaws 4 are closed or opened, depending on the operating direction of the drilling machine. Alternatively, the user may rotate the clamping sleeve manually to adjust clamping jaws 4. The rotation of clamping sleeve 2 via locking sleeve 16/locking ring 17 is transmitted to threaded ring 13. When clamping jaws 4 come into abutment with a tool shaft to be clamped, the resistance increases and control cam 23 is disengaged from engagement seat 28 defining the clamping position, and a relative movement, limited by engagement seat 28, occurs between clamping sleeve 2 and threaded ring 13. Control cam 23 is guided along radial cam 24, which is provided between engagement seats 28, and transferred by elastic restoring element 22 into the drilling configuration, in which control cam 23 is engaged with engagement seat 28 defining the drilling configuration. Lock toothing 18 is now in engagement with mating toothing 19. If the drive continues to be actuated, or if clamping sleeve 2 continues to rotate in the clamping direction, a tensioning is possible by suitably selecting lock toothing 18 and mating toothing 19, i.e., the toothing engagement is released by a withdrawal of lock toothing 18, and lock toothing 18 slides over mating toothing 19. The adjustment takes place in the opposite sequence when clamping jaws 4 are opened.

Starting from the drilling configuration, in which lock toothing 18 is in engagement with mating toothing 19, the toothing engagement between lock toothing 18 and mating toothing 19 is released by rotating clamping sleeve 2, and locking sleeve 16/locking ring 17 is axially adjusted by radial cam 24 on threaded ring 13 and then engages with engagement seat 28 defining the clamping configuration. Clamping jaws 4 may now be opened by actuating a drive of a drilling machine which is coupled with chuck body 3 and whose operating direction was changed in comparison with the clamping operation. Alternatively, the relative rotation between the chuck body and the threaded ring may also take place by manually rotating clamping sleeve 2.

If it is not possible to manually rotate clamping sleeve 2 when clamping jaws 4 are clamped, for the purpose of releasing the locking engagement, due to a blocked locking device 21, which may occur during percussion drilling in particular, an emergency release may be facilitated with the aid of the drive of a drilling machine coupled with chuck body 2 by suitably selecting the slope of locking flanks 37. Alternatively, the user may rotate clamping sleeve 2 manually by applying increased force.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A drill chuck comprising:
a chuck body on which a threaded ring is guided that is in engagement with rows of teeth assigned to clamping jaws for adjusting the clamping jaws having a thread and being guided in the chuck body; and
a clamping sleeve that surrounds the chuck body and is coupled with the threaded ring in a torque-transmitting manner and that are coupled with the chuck body by a locking device, the locking device being formed by a locking sleeve that has a lock toothing and is non- rotatably, permanently connected to the threaded ring and that is axially adjustable between a drilling configuration and a clamping configuration relative to the threaded ring and the clamping sleeve, and the locking device also being formed by a mating toothing assigned to the chuck body, wherein the mating toothing is provided on a toothed ring that is non-rotatably, permanently connected to the chuck body, wherein the toothed ring is axially adjustable against a spring element supported on the chuck body, and wherein at least one control cam is assigned to the locking sleeve, upon which a radial cam directly assigned to the clamping sleeve acts for axial adjustment of the locking sleeve.

2. The drill chuck according to claim 1, wherein the toothing engagement formed between the lock toothing and the mating toothing operates in an axial direction.

3. The drill chuck according to claim 1, wherein an elastic restoring element acts upon the locking sleeve.

4. The drill chuck according to claim 3, wherein the elastic restoring element is formed by a sinuous spring.

5. The drill chuck according to claim 1, wherein the radial cam is delimited by at least one engagement seat defining the drilling configuration and/or the clamping configuration.

6. The drill chuck according to claim 1, wherein the threaded ring is formed in multiple parts from a ring, which is divided in half and carries an inner thread, and a toothed sleeve, which connects the ring divided in half and which is rotatably fixedly connected to the locking sleeve.

7. The drill chuck according to claim 1, wherein the lock toothing provided on the locking sleeve and the mating toothing assigned to the chuck body and corresponding to the lock toothing are formed from a plurality of locking teeth each having a locking flank and a tensioning flank.

8. The drill chuck according to claim 7, wherein a slope of the locking flank of the toothing engagement formed between the lock toothing and the mating toothing is greater than or equal to the slope of the tensioning flank.

9. The drill chuck according to claim 7, wherein the slope of the locking flank is greater than or equal to 45°.

10. The drill chuck according to claim 7, wherein the locking flanks of the locking teeth are oriented parallel to the tensioning flanks.

11. The drill chuck according to claim 1, wherein a slope of the clamping jaws with regard to the chuck axis is taken from a range which is between 15° and 25°.

12. The drill chuck according to claim 1, wherein a slope of the clamping jaws with regard to the chuck axis is 20°.

13. A drill chuck comprising:
a chuck body;
a threaded ring disposed on the chuck body;
clamping jaws having rows teeth in engagement with the threaded ring for adjusting the clamping jaws;
a clamping sleeve surrounding the chuck body and coupled with the threaded ring;
a locking device coupling the clamping sleeve with the chuck body, the locking device comprising:
a locking sleeve having a lock toothing non-rotatably, permanently connected to the threaded ring and that is axially adjustable relative to the threaded ring and the clamping sleeve;
a spring element supported on the chuck body;
a mating toothing non-rotatably, permanently connected to the chuck body;
at least one control cam assigned to the locking sleeve; and
a radial cam directly assigned to the clamping sleeve, the radial cam acting on the at least one control cam for axial adjustment of the locking sleeve,
wherein the toothed ring is axially adjustable against the spring element.

14. The drill chuck according to claim 7, wherein the slope of the locking flank is greater than 60°.

15. The drill chuck according to claim 7, wherein the slope of the locking flank is greater than 80°.

* * * * *